(12) United States Patent
Siciliano et al.

(10) Patent No.: US 11,256,743 B2
(45) Date of Patent: Feb. 22, 2022

(54) INTERMIXING LITERAL TEXT AND FORMULAS IN WORKFLOW STEPS

(71) Applicant: Microsoft Technology Licensing, LLC, Redmond, WA (US)

(72) Inventors: Stephen Siciliano, Bellevue, WA (US); Charles W. Lamanna, Bellevue, WA (US); You Tang, Bothell, WA (US); Nitish Kumar Meena, Seattle, WA (US); Jeffrey S. Hollan, Snoqualmie, WA (US); Balasubramanian Shyamsundar, Redmond, WA (US); Priti Sambandam, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 298 days.

(21) Appl. No.: 15/868,974

(22) Filed: Jan. 11, 2018

(65) Prior Publication Data

US 2018/0285476 A1    Oct. 4, 2018

Related U.S. Application Data

(60) Provisional application No. 62/479,282, filed on Mar. 30, 2017.

(51) Int. Cl.
| | |
|---|---|
| *G06F 16/00* | (2019.01) |
| *G06F 16/90* | (2019.01) |
| *G06F 7/02* | (2006.01) |
| *G06F 17/10* | (2006.01) |
| *G06F 8/34* | (2018.01) |
| *G06F 40/10* | (2020.01) |
| *G06F 16/2458* | (2019.01) |

(52) U.S. Cl.
CPC ............. *G06F 16/90* (2019.01); *G06F 7/02* (2013.01); *G06F 8/34* (2013.01); *G06F 16/2474* (2019.01); *G06F 17/10* (2013.01); *G06F 40/10* (2020.01)

(58) Field of Classification Search
CPC .................................................. G06F 16/2474
See application file for complete search history.

(56) References Cited

U.S. PATENT DOCUMENTS 7,631,291 B2    12/2009    Shukla et al.
8,738,590 B2    5/2014    Bezar et al.
(Continued)

OTHER PUBLICATIONS

"OnCommand Workflow Automation 2.2", Retrieved From: <<https://library.netapp.com/ecm/ecm_download_file/ECMP1397249>>, May 2014, pp. 1-65.

*Primary Examiner* — Ajith Jacob
(74) *Attorney, Agent, or Firm* — Fiala & Weaver P.L.L.C.

(57) ABSTRACT

Methods, systems, apparatuses, and computer program products are provided for intermixing expressions with other types of data in input controls. A system includes a processor and a memory that stores program code configured to be executed by the processor. The program code comprises a step configuration interface configured to receive, via a same input control, an expression as a first segment and a different type of data from an expression as a second segment. The program code further comprises a logic generator configured to generate a serialized representation that includes a serialized version of the first segment and a serialized version of the second segment.

20 Claims, 11 Drawing Sheets

(56) References Cited

U.S. PATENT DOCUMENTS

| | | | |
|---|---|---|---|
| 8,856,291 B2 | 10/2014 | Bartlett et al. | |
| 2002/0156614 A1* | 10/2002 | Goode | G06F 17/5027 |
| | | | 703/25 |
| 2008/0235045 A1 | 9/2008 | Suzuki et al. | |
| 2009/0089657 A1* | 4/2009 | Davis | G06F 16/94 |
| | | | 715/234 |
| 2010/0050153 A1 | 2/2010 | Louie et al. | |
| 2011/0004837 A1 | 1/2011 | Copland et al. | |
| 2013/0268263 A1* | 10/2013 | Park | G06F 40/111 |
| | | | 704/9 |
| 2015/0178292 A1* | 6/2015 | Nie | G06F 16/164 |
| | | | 707/756 |
| 2016/0103706 A1 | 4/2016 | Novaes | |
| 2016/0285985 A1* | 9/2016 | Molettiere | G06F 3/04842 |

\* cited by examiner

INTERMIXING LITERAL TEXT AND FORMULAS IN WORKFLOW STEPS

CROSS-REFERENCE TO RELATED APPLICATIONS

This application claims priority to U.S. Provisional Patent Application No. 62/479,282, filed Mar. 30, 2017 and entitled "Intermixing Field Inputs with User Syntax," the entirety of which is incorporated by reference herein.

BACKGROUND

An application is a computer program used by users to perform various functions. Applications are frequently developed when available off-the-shelf software does not completely address the desired functionality. Many applications are interactive, having a graphical user interface (GUI) into which users can input data, use to submit data queries, use to perform operations, and/to use to view results. Consumer applications are less business focused, instead being focused on the needs of the consumer.

Users tend to depend on information technology (IT) personnel to code their applications due to application complexity, and the programming expertise required. Even merely designing an application to pull data from a remote source (e.g., a cloud service) is difficult, typically requiring an experienced software developer.

Typically, to input a formula into an application that allows for formulas (e.g., Microsoft® Excel®), a developer has to change the entire field type to "formula" (or equivalent type) As such, the developer can no longer enter information in that field other than formula information (i.e., by typing in text). Furthermore, to combine strings and formulas into a field, a developer needs to write the "expression version" of a string. In these approaches, the developer must write an expression and must clarify this intent at the outset, (for example, with a=and & in the case of Microsoft® Excel®). Alternatively, literal strings can be typed into text input fields.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for developing workflows and other applications that enable a user to mix expressions and other types of information in a same input control. A step configuration interface is configured to receive, via a same input control, an expression as a first segment and a different type of data from an expression as a second segment. A logic generator is configured to generate a serialized representation that includes a serialized version of the first segment and a serialized version of the second segment. The serialized representation may be executed at runtime to cause the expression of the serialized first segment to be evaluated at runtime based on input data while the data of the second segment is also handled in its own manner at runtime. The serialized representation may be deserialized to be redisplayed in the workflow input control for further editing of the expression of the second segment.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
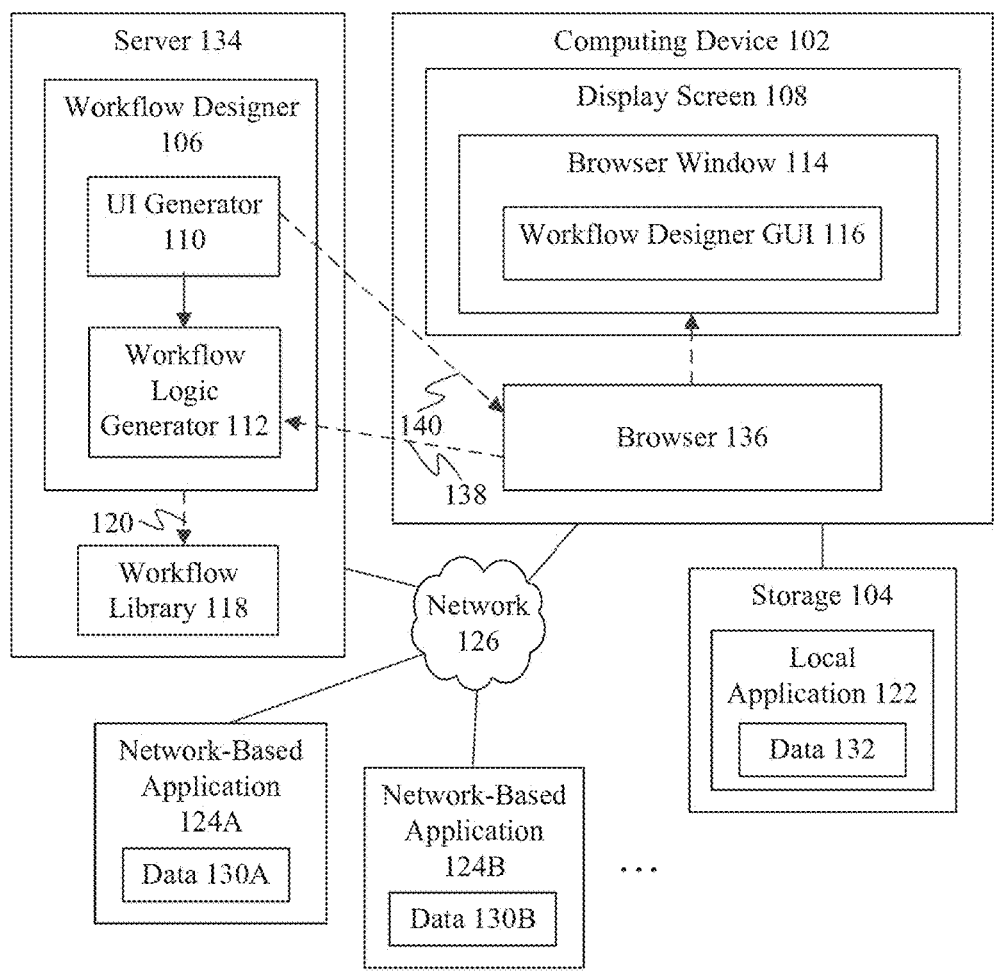
FIG. 1 shows a workflow development system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Still further, "a" or "an" preceding a particular element or feature should be understood to encompass one or more of the particular element or feature.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Development of Workflows

Applications typically are created when available off-the-shelf software does not completely address desired functionality. Many applications are interactive, having a graphical user interface (GUI) into which users can input data, use to submit data queries, use to perform operations, and/to use to view results.

Users tend to depend on information technology (IT) personnel to code their applications due to application complexity and the programming expertise required. For instance, configuring an application to pull data from a source of interest to enterprises or consumers (e.g., data from an SQL (structured query language) database, customer relationship information from Salesforce.com of San Francisco, Calif., social network information from Facebook® operated by Facebook, Inc. of Palo Alto, Calif., or Twitter® operated by Twitter, Inc. of San Francisco. Calif.) is a difficult process.

Embodiments enable easier development of user applications. Developers are enabled to develop user applications in the form of workflows without having to be expert programmers. Embodiments further enable developers to develop user application in the form of workflows using both user inputted text and expressions, which are configurable in any way. (i.e., text-expression-text; text-text-expression-expression-text; etc.)

Example embodiments are described in the following sections for development of user application workflows. In the following description, a person that develops a user application using the techniques described herein is referred to as a "developer," to be distinguished from a person that uses the user application at runtime (a "user" or "end user"). It is noted, however, that a "developer," as referred to herein, does not need to have expertise in computer programming. The embodiments described herein enable application development without special programming skills.

A. Example Workflow Development Embodiments

Development of workflows may be enabled in various ways in embodiments. For instance, FIG. 1 shows a workflow development system 100, according to an example embodiment. As shown in FIG. 1, system 100 includes a computing device 102, storage 104, a first network-based application 124A, a second network-based application 124B, and a server 134. Server 134 includes a workflow designer 106 and a workflow library 118 (e.g., in storage). Workflow designer 106 includes an UI generator 110 and a workflow logic generator 112. Computing device 102 includes a display screen 108 and a browser 136. Storage 104 stores a local application 122. System 100 is described as follows.

Computing device 102 may be any type of stationary or mobile computing device, including a mobile computer or mobile computing device (e.g., a Microsoft® Surface®, device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Server 134 may include one or more server devices and/or other computing devices.

Local application 122 in storage 104 is an example of an application accessible by computing device 102 without communicating over a network. Local application 122 may be configured to perform data processing and/or data hosting operations when executed by a processor of computing device 102, and may provide data 132 to workflows created by workflow designer 106 during runtime of those workflows. Local application 122 may be any type of local application/service, such as a database application (e.g., QuickBooks®), a Microsoft® Excel® spreadsheet), a messaging application (e.g., Microsoft® Outlook®), a productivity application (e.g., Microsoft® Word®, Microsoft® PowerPoint®, etc.), or another type of application. Although FIG. 1 shows a single local application, any number of local applications may be present at computing device 102, including numbers in the tens, hundreds, or greater numbers.

First and second network-based applications 124A and 124B are examples of network-based applications, which may be "cloud" applications or services. A "cloud" application or service in a network architecture/platform referred to as a cloud architecture/platform. A cloud platform includes a networked set of computing resources, including servers, routers, etc., that are configurable, shareable, provide data security, and are accessible over a network such as the Internet. Cloud applications run on the resources, often atop operating systems that run on the resources, for entities that access the applications over the network. A cloud platform may support multi-tenancy, where cloud platform-based software services multiple tenants, with each tenant including one or more users who share common access to software services of the cloud platform. Each tenant has a dedicated share of the cloud platform (e.g., data, one or more servers, one or more software applications, etc.) separate from other tenants. Furthermore, a cloud platform may support hypervisors implemented as hardware, software, and/or firmware that run virtual machines (emulated computer systems, including operating systems) for tenants. A hypervisor presents a virtual operating platform for tenants.

Network-based applications 124A and 124B are accessible by computing device 102 over network 126, may be configured to perform data processing and/or data hosting operations, and may provide data 130A and 130B, respectively, to workflows created by workflow designer 106 during runtime of those workflows. Network-based applications 124A and 124B may each be any type of web accessible applications/services, such as database applications, social networking applications, messaging applications, financial services applications, news applications, search applications, web-accessible productivity applications, cloud storage and/file hosting applications, etc. Examples of such applications include a web-accessible SQL (structured query language) database, Salesforce-.com™, Facebook®, Twitter®, Instagram®, Yammer®, LinkedIn®, Yahoo!® Finance, The New York Times®, (at www.nytimes.com), Google search, Microsoft® Bing, Google Docs™, Microsoft® Office 365, Dropbox™, etc. Although FIG. 1 shows two network-based applications, any number of network-based applications may be accessible over network 126, including numbers in the tens, hundreds, thousands, or greater numbers.

Note that data 128, data 130A, data 130B, and data 132 may each include any type of data, including messages, notifications, calculated data, retrieved data, and/or any other type of information requested or usable by a workflow.

Computing device 102 and server 134 may each include at least one network interface that enables communications with each other and with network-based applications 124A and 124B over network 126. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN), a personal area network (PAN), and/or a combination of communication networks, such as the Internet.

Workflow designer 106 is configured to be operated/interacted with to create workflows. For instance, a developer may access workflow designer 106 by interacting with an application at computing device 102 capable of accessing a network-based application, such as browser 136. The developer may use browser 136 to traverse a network address (e.g., a uniform resource locator) to workflow designer 106, which invokes a workflow designer GUI 116 (e.g., a web page) in a browser window 114. The developer is enabled to interact with workflow designer GUI 116 to develop a workflow.

As shown in FIG. 1, workflow designer 106 includes UI generator 110 and workflow logic generator 112. UI generator 110 is configured to transmit workflow GUI information 140 (e.g., one or more web pages, image content, etc.) to browser 136 to be displayed as workflow designer GUI 116 in display screen 108 in browser window 114. Workflow designer GUI 116 may be interacted with by the developer to select and configure workflow steps into a workflow. For example, the developer may insert and sequence a plurality of workflow steps in workflow designer GUI 116, with one or more of the steps being associated with a local or network-based application. Browser 136 stores the selected workflow steps, corresponding configuration information, and workflow step sequence information as constructed workflow information 138. Constructed workflow information 138 is transmitted to workflow logic generator 112 at server 134. Workflow logic generator 112 generates workflow logic 120 based on the assembled workflow represented by constructed workflow information 138. The workflow represented by workflow logic 120 may subsequently be invoked at runtime by an end user.

During runtime of the workflow, workflow logic 120 may invoke operation of one or more local or network-based applications associated with the workflow steps of workflow logic 120. Each workflow step may receive input data 128 from workflow designer GUI 116, data 132 from local application 122, data 130A or data 130B from one or both of local or network-based applications 124A and 124B, and/or data from another workflow step of workflow logic 120.

Figure 2:
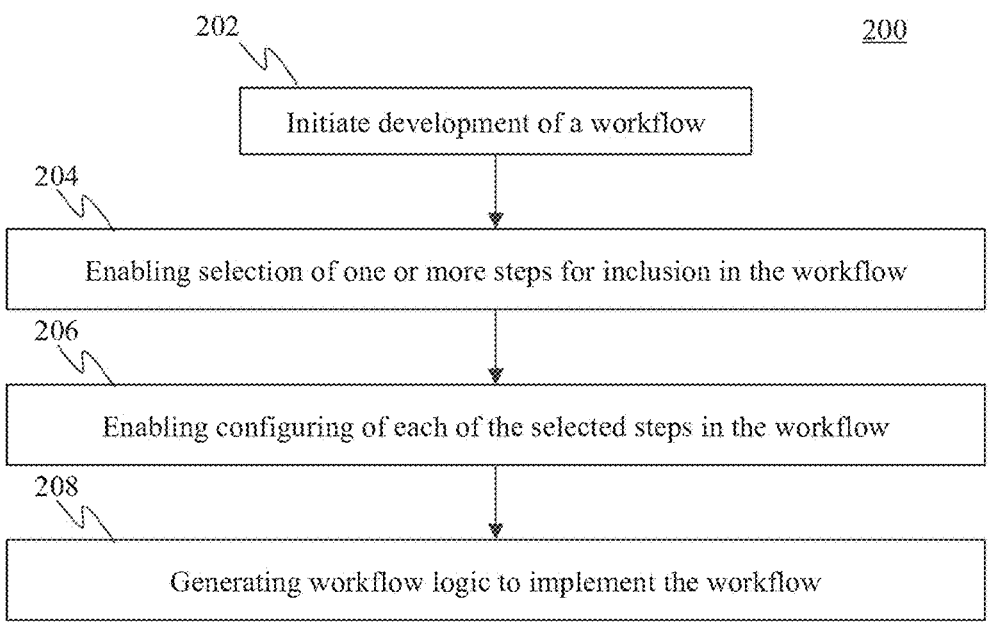
FIG. 2 shows a flowchart providing a process for development of workflows, according to an example embodiment.
Figure 3:
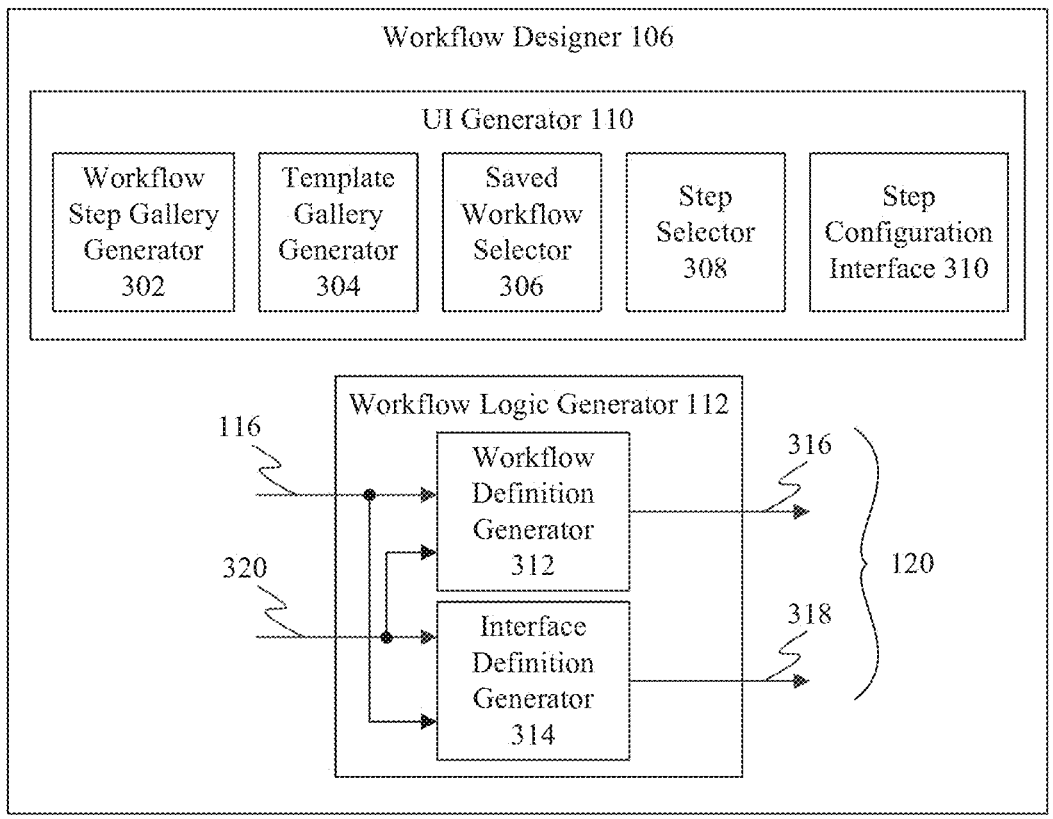
FIG. 3 shows a block diagram of a workflow designer application, according to an example embodiment.
Figure 4:
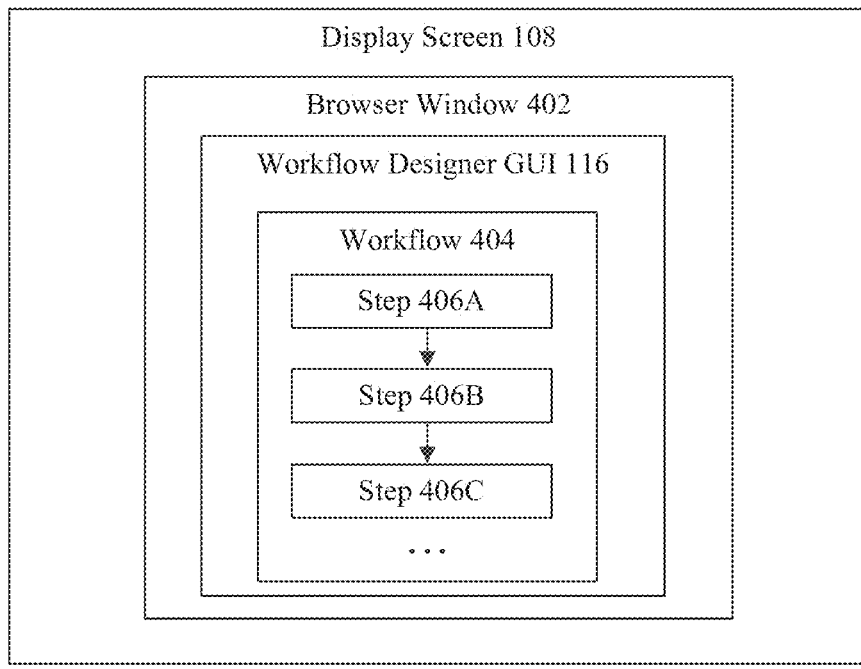
FIG. 4 shows a block diagram of a display screen showing a browser window displaying an exemplary workflow, according to an example embodiment.

Workflow designer 106 may operate in various ways, to enable development of a workflow. For instance, in embodiments, workflow designer 106 may operate according to FIG. 2. FIG. 2 shows a flowchart 200 providing a process for development of workflows, according to an example embodiment. Flowchart 200 and workflow designer 106 are described as follows with respect to FIGS. 3 and 4. FIG. 3 shows a block diagram of workflow designer 106, according to an example embodiment. As shown in FIG. 3, workflow designer 106 includes UI generator 110 and workflow logic generator 112. UI generator 110 includes a workflow step gallery generator 302, a template gallery generator 304, a saved workflow selector 306, a step selector 308, and a step configuration interface 310. Workflow logic generator 112 includes a workflow definition generator 312 and an interface definition generator 314. FIG. 4 shows a block diagram of display screen 108, illustrating an example of workflow designer GUI 116 displayed in browser window 402 on display screen 108, according to an example embodiment Flowchart 200 of FIG. 2 begins with step 202. In step 202, development of a workflow is initiated. For example, in an embodiment, workflow designer 106 may be invoked by a developer interacting with browser 136 at computing device 102. The developer may traverse a link or other network address directed to workflow designer 106 at server 134, to invoke workflow designer 106, causing workflow designer 106 to provide workflow GUI information 140 (e.g., one or more web pages, image content, etc.) to browser 136 to be displayed as workflow designer GUI 116 in display screen 108 in browser window 114. Once invoked, the developer may open an existing workflow for further development, or may begin a new workflow.

For instance, a displayed page of workflow designer GUI 116 may display a gallery or workflow steps generated by workflow step gallery generator 302. The workflow step gallery includes a plurality of selectable workflow steps. The workflow steps may be stored in workflow library 118, and accessed for display by workflow designer GUI 116. The developer may select one of the workflow steps for inclusion in their workflow, and may proceed with configuring the contents of the workflow step, and/or may add additional workflow steps to continue generating their workflow.

For example, as shown in FIG. 4, workflow step gallery generator 302 may enable steps 406A, 406B, and 406C to be selected for insertion into a workflow 404 being assembled in workflow designer GUI 116. Any number of workflow steps may be inserted.

In another example, a displayed page of workflow designer GUI 116 may display a template gallery generated by template gallery generator 304. The template gallery includes a plurality of selectable workflow templates, which each include one or more workflow steps pre-connected for operation. The workflow templates may be stored in workflow library 118, and accessed for display by workflow designer GUI 116. The developer may select one of the workflow templates for inclusion in their workflow, and may proceed with configuring the contents of the workflow template, and/or may add additional workflow steps to the workflow steps of the workflow template to generate a more complex workflow.

For instance, in the example of FIG. 4, steps 406A and 406B may have been included in a workflow template placed in workflow 404, step 406C may have been subsequently added (e.g., from a workflow step gallery).

In another example, saved workflow selector 306 may enable the developer to select an existing, saved workflow to be opened for further editing in a displayed page of workflow designer GUI 116. The saved workflows may be stored in workflow library 118 or elsewhere. For example, saved workflow selector 306 may display a list of saved workflows, may enable navigation to a saved workflow, and/or may provide another mechanism for selecting a saved workflow for editing. The developer may then proceed with further configuring the contents of the workflow, and/or may add additional workflow steps to the workflow steps of the workflow to generate a more complex workflow.

In step 204, selection of one or more steps for inclusion in the workflow is enabled. When a developer is editing a workflow, step selector 308 may enable the developer to select further workflow steps for inclusion in the workflow, and to order the steps. The workflow steps may be accessed by step selector 308 in workflow library 118. For instance, step selector 308 may display a pull-down menu of workflow steps, a scrollable and/or searchable list of available workflow steps, or may provide the workflow steps in another manner, and may enable the developer to select any number of workflow steps from the list for inclusion in the workflow.

In one example, step selector 308 may enable a developer to select a step that is associated with a local application, such as Microsoft® Outlook®, or a network-based application, such as Facebook®. Step selector 308 enables the steps to be chained together in a sequence, optionally with conditional steps, for inclusion in workflow logic 120.

In step 206, each of the selected steps in the workflow is enabled to be configured. In an embodiment, step configuration interface 310 enables configuration of each workflow step in a workflow. Step configuration interface 310 accesses each selected workflow step in workflow library 118 to determine the configuration of the workflow step, including all of its input parameters and any other selections or information that a user or developer needs to provide to the workflow step to configure it For example, step configuration interface 310 may generate a UI that enables the developer to type, navigate to, use a pull-down menu, or otherwise enter input data into a text input box or other data input element (e.g., input parameter) of a workflow step. The developer may configure an output of a prior step to be input data for a workflow step. Step configuration interface 310 may enable data or other objects to be copied and pasted, dragged and dropped, or otherwise entered copied from elsewhere into data input boxes of a workflow step.

In step 208, workflow logic to implement the workflow is generated. In an embodiment, workflow logic generator 112 is configured to package and generate workflow logic 120 based on constructed workflow information 138 when the developer indicates the workflow is finished, such as when the developer interacts with workflow designer GUI 116 to save the workflow. As shown in FIG. 3, workflow logic generator 112 receives constructed workflow information 138. Constructed workflow information 138 indicates which workflow steps have been inserted into the workflow, their input parameter values, and their sequencing. Workflow logic generator 112 also receives selected workflow logic 320, which is the workflow logic for each workflow step of the workflow as indicated in constructed workflow information 138. In one example, workflow logic generator 112 retrieves workflow logic from workflow library 118 for each workflow step indicated in constructed workflow information 138, to receive selected workflow logic 320. Workflow logic generator 112 generates workflow logic 120 for the workflow based on constructed workflow information 138 and selected workflow logic 320. For example, workflow logic generator 112 may generate workflow logic 120 in the form of an executable file, a zip file, or other form, which may be executed in a standalone fashion, may be executed in a browser, or may be executed in another manner, depending on the particular type of workflow being generated. This generation of workflow logic 120 by workflow logic generator 112 may be referred to as "serialization" of constructed workflow information 138 and selected workflow logic 320 into workflow logic 120.

With reference to FIG. 3, workflow logic generator 112 may generate workflow logic 120 to include at least two components (e.g., files): workflow definition information 316 and interface definition information 318. Workflow definition information 316 includes information that defines the sequence and operation of the workflow of workflow logic (e.g., lists the workflow step operations and their ordering/sequencing) and includes the parameter values for the workflow. For example, workflow definition information 316 may be generated to contain information in the format of a JSON (JavaScript object notation) file or in another form. Interface definition information 318 includes information that defines the interfaces/parameters (e.g., inputs and outputs) of the workflow steps of the workflow. For example, interface definition information 318 may be generated to contain information in the format of a Swagger (a specification for REST (representational state transfer) web services) file or in another form. For instance, each workflow step may be represented in workflow library 118 as API (application programming interface) metadata in Swagger format, defining what are the necessary inputs and outputs (parameters) of the workflow step, such that a service may be accessed according to the API definition. In such an implementation, the operations in the workflow definition information 316 refer to the corresponding API metadata in the interface definition information 318 to give a complete structure of a generated workflow (e.g., each sequenced workflow step/operation defined with parameter values in the workflow definition information 316 has a corresponding API, which is defined in the interface definition information 318).

Accordingly, flowchart 200 and workflow designer 106 enable a developer to create workflows. FIGS. 5-8 shows views of an exemplary workflow in various phases of development using a development GUI, according to example embodiments. For example, each of FIGS. 5-8 show browser window 402 displaying a corresponding view of workflow designer GUI 116 being used to develop a workflow.

Figure 5:
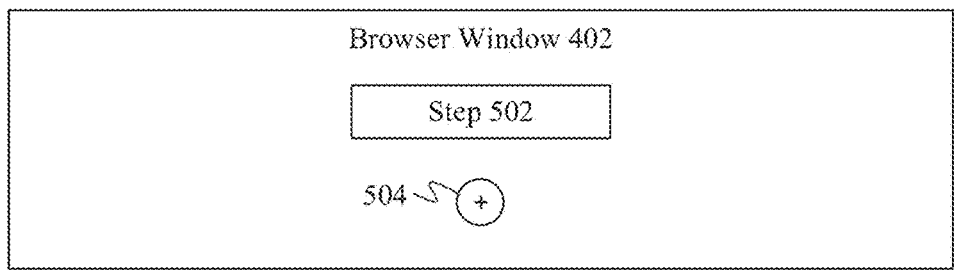
FIGS. 5-8 shows views of an exemplary workflow in various phases of development using a development GUI, according to example embodiments.

For instance, FIG. 5 shows browser window 402 including a workflow step 502 and an add interface 504. Workflow step 502 was selected by a developer to be a first step in a workflow. Add interface 504 (e.g., a button or other GUI control) may be interacted with by the developer to add further workflow steps to the workflow.

As described above, a developer is enabled to select workflow step 502 from a list or library of steps, a gallery of workflow steps, a template gallery, or elsewhere. A list, library, or gallery may include any number of workflow steps. The workflow steps may be associated with network-based applications mentioned elsewhere herein or otherwise known (e.g., Dropbox™), and/or with local applications mentioned elsewhere herein or otherwise known (e.g., Microsoft®, Outlook®). Each workflow step is configured for plug-and-place into the workflow. Each workflow step is configured with the appropriate logic and/or interface(s) to perform its respective function(s), which may include communicating with a local or remote application. For instance, a workflow step may be configured to transmit a query to an application (e.g., a search query to a search engine, a database query to a database, a request for data from a social networking application, etc.), being pre-configured how to properly transmit and format such a request to the application. The workflow step may be configured to receive a response to the request, being pre-configured how to parse the response for desired response data. As such, a developer of a workflow does not need to know how to write program code in a programming language, to interface with complex application interfaces (e.g., application programming interfaces (APIs)), or to understand network communication protocols, as the workflow steps are already setup. When a workflow step is plugged into workflow logic by a developer, the developer configures the inputs to the workflow step (as described below), and the otherwise pre-configured workflow step handles any communications with other applications.

Figure 6:
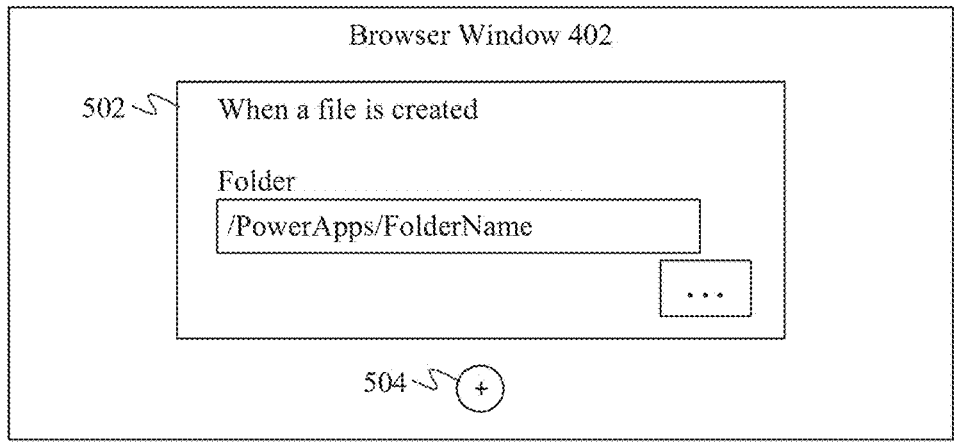

In FIG. 6, the developer has interacted with step 502 (e.g., by mouse click, etc.) to cause step configuration interface 310 to generate a UI for configuration of step 502. For instance, in the example of FIG. 6, workflow step 502 is configured to monitor for a file to be created in a particular folder identified by the developer in a text input box (e.g., by typing, clicking on a navigator indicated by " . . . ", etc.). When workflow step 502 determines a file is added to the indicated folder, a workflow step following workflow step 502 is triggered. Thus, workflow step 502 may be considered a trigger step in this example.

Figure 7:
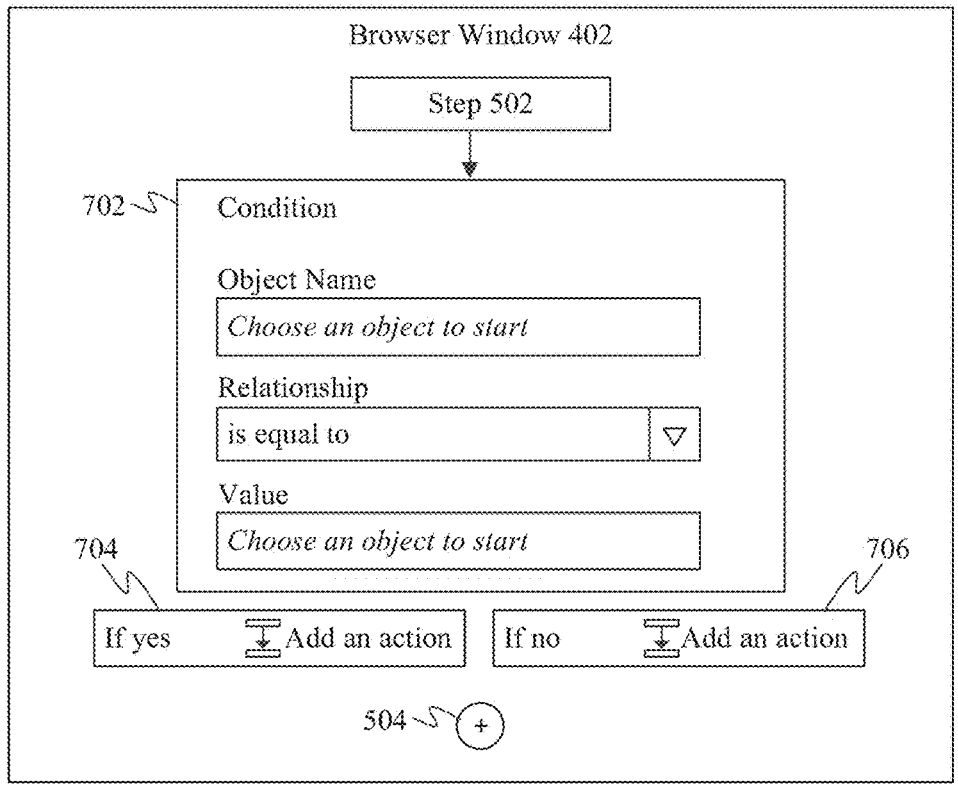

For instance, in FIG. 7, the developer interacted with add interface 504 to select a next workflow step 702. In an embodiment, interaction with add interface 504 invokes step selector 308 in FIG. 3, which enables the developer to select a workflow step. In the example of FIG. 7, workflow step 702 is a conditional step. In embodiments, logical elements may be selected for inclusion in a workflow, including arithmetic logic (e.g., summers, multipliers, etc.), conditional logic, etc., that operate based on variable values determined in earlier workflow steps. The condition of workflow step 702 enables the workflow to fork based on the determination of a condition (e.g., a variable value). The condition may include an object name, a relationship (e.g., a logical relationship, such as equal to, includes, not equal to, less than, greater than, etc.), and a value, which are all defined by the developer interacting with workflow step 702. Corresponding action steps may be performed depending on which way the workflow forks based on the condition.

In one illustrative example of FIG. 7, the object name may be selected (e.g., from a list of possibilities) to be a name of the created file of workflow step 502, the relationship may be "contains" (e.g., selected by a pull-down menu) and the value may be "dummyfile" (e.g., typed in by the developer). The condition evaluates to a "yes" condition if the file name contains "dummyfile," which invokes first action workflow step 704, and evaluates to "no" condition if the file name does not contain "dummyfile," which invokes second action workflow step 706. An action may be defined for one or both of the "yes" and "no" action workflow steps 704 and 706 by the developer, if desired.

Figure 8:
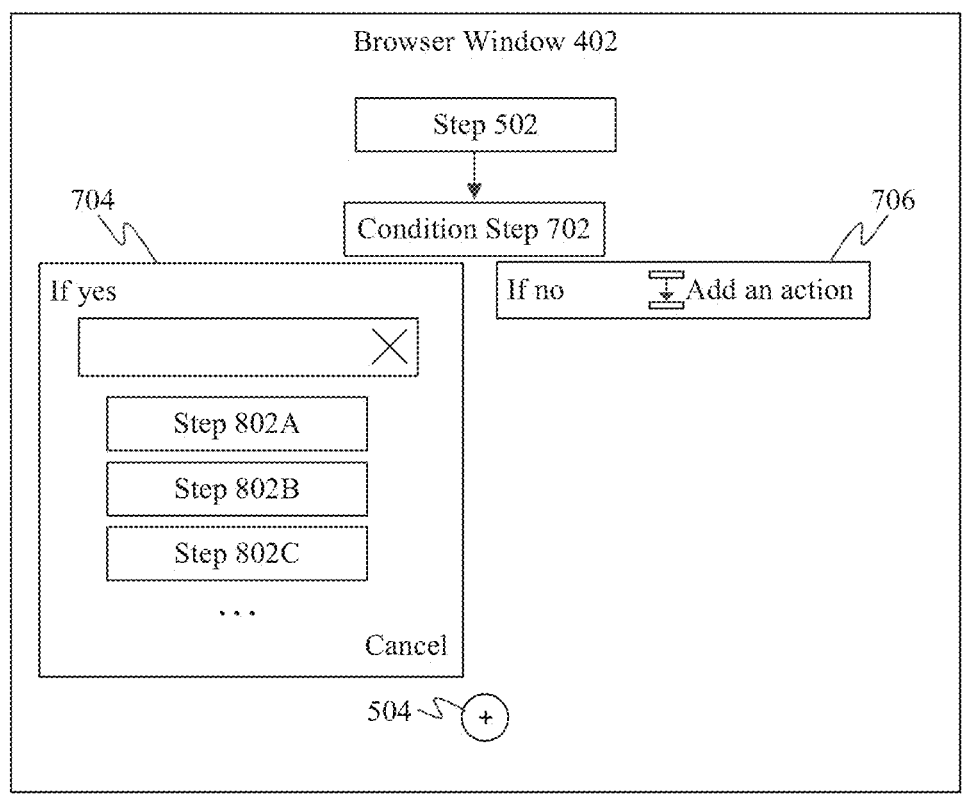

For example, in FIG. 8, the developer interacts with action workflow step 704 to define an action. In this example, the developer is defining action workflow step 704 by selecting a workflow step via step selector 308. As shown in FIG. 8, a list of workflow steps 802A, 802B, 802C is displayed, from which the developer can select a workflow step (e.g., by mouse click, etc.) to be performed for action workflow step 704. The workflow step can be a trigger step, an action step, or a condition step. After selecting the workflow step, the developer may configure the workflow step as described above. Furthermore, the developer may configure an action for workflow step 706, may add further workflow steps, etc., eventually being enabled to save the workflow.

It is noted that in some embodiments, a workflow step, such as first workflow step 502, may require credentials (e.g., a login and password) to access indicated data (e.g., to access a file at the location indicated in the text input box in FIG. 6). As such, the developer may be requested to provide credential information in association with first workflow step 502 so that when first workflow step 502 is performed during runtime, the data may be accessed. Alternatively, the credentials may be requested of a user during runtime.

B. Example Runtime Embodiments

According to embodiments, end users may execute workflows developed as described herein. During operation, an end user may interact with a GUI of the workflow, which may lead to workflow logic being executed. The workflow logic may execute locally (e.g., in a browser) and/or at a remote service (in "the cloud"). The workflow logic may access data of one or more applications, local or network-accessible, as was configured by the developer. Accordingly, the workflow performs its intended functions.

Figure 9:
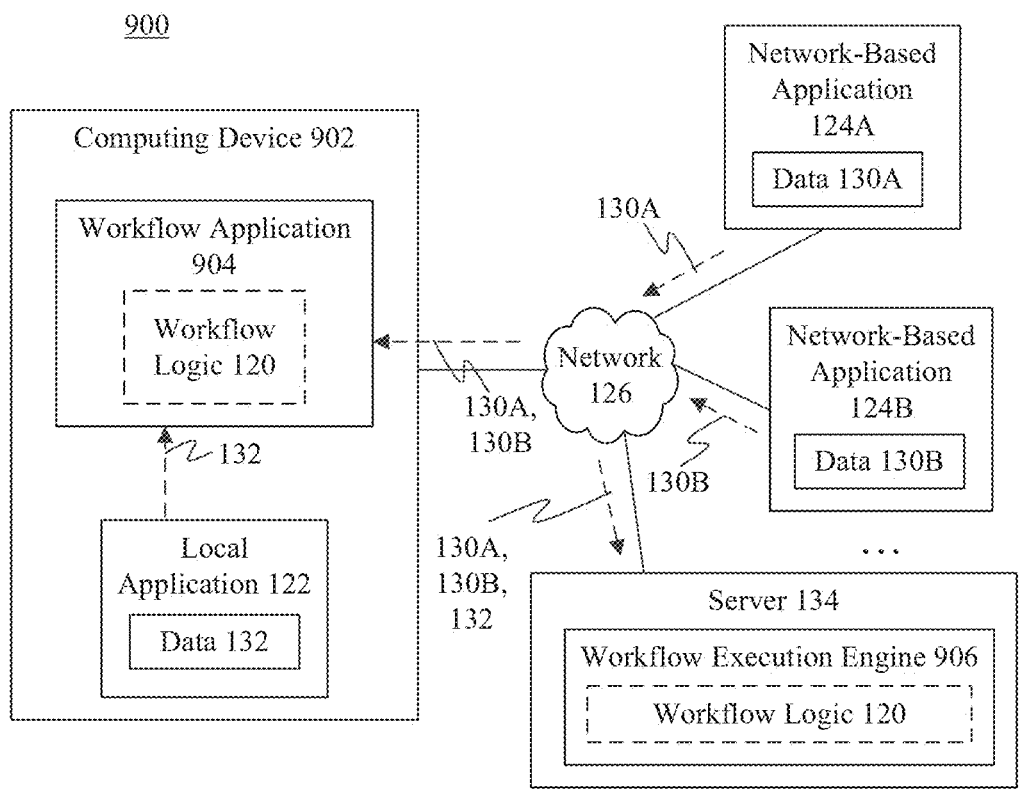
FIG. 9 shows a block diagram of a system for operating a workflow, according to an example embodiment.

FIG. 9 shows a block diagram of a system 900 for operating a workflow that includes one or more workflow steps, according to an example embodiment. As shown in FIG. 9, system 900 includes a computing device 902, first network-based application 124A, second network-based application 124B, and server 134. Computing device 902 includes a workflow application 904. Server 134 includes a workflow execution engine 906. System 100 is described as follows.

First and second network-based applications 124A and 124B are each optionally present, depending on the configuration of workflow logic 120. Further network-based applications may be present, depending on the configuration of workflow logic 120.

Computing device 902 may be any type of stationary or mobile computing device described herein or otherwise known. Computing device 902 is configured to communicate with first and second network-based applications 124A and 124B and server 134 over network 126.

In one embodiment, workflows are executed at server 134 by workflow execution engine 906, and workflow application 904 is a UI application that enables a user at computing device 902 to interact with the executing workflows, such as by selecting and invoking the workflows, receiving communications from the executing workflows (e.g., messages, alerts, output data, etc.), providing requested input data to executing workflows, etc. In such an embodiment, workflow application 904 may be a workflow UI application associated with workflow execution engine 906 (e.g., workflow application 904 may be an extension of workflow execution engine 906) that may operate separate from or within a browser at computing device 902, or may be configured in another way. As shown in FIG. 9, workflow execution engine 906 may load workflow logic 102 for a selected workflow (e.g., selected from a workflow library by a user), and may execute workflow logic 102 to execute the workflow.

In another embodiment, workflow application 902 may be configured to execute workflows at computing device 902. For instance, an end user of computing device 902 may interact with a user interface of workflow application 902 to select and invoke a particular workflow (e.g., selected from a workflow library). In such embodiments, workflow logic 120 may operate separate from or in a browser at computing device 902, or may be configured in another way. As shown in FIG. 9, workflow application 904 may load workflow logic 120 for a selected workflow (e.g., selected from a workflow library by a user), and may execute workflow logic 120 to execute the workflow.

In another embodiment, a first portion of workflow logic 120 may operate in workflow application 904 at computing device 902 and a second portion of workflow logic 120 may operate in workflow execution engine 906 at server 134 and/or elsewhere.

Figure 10:
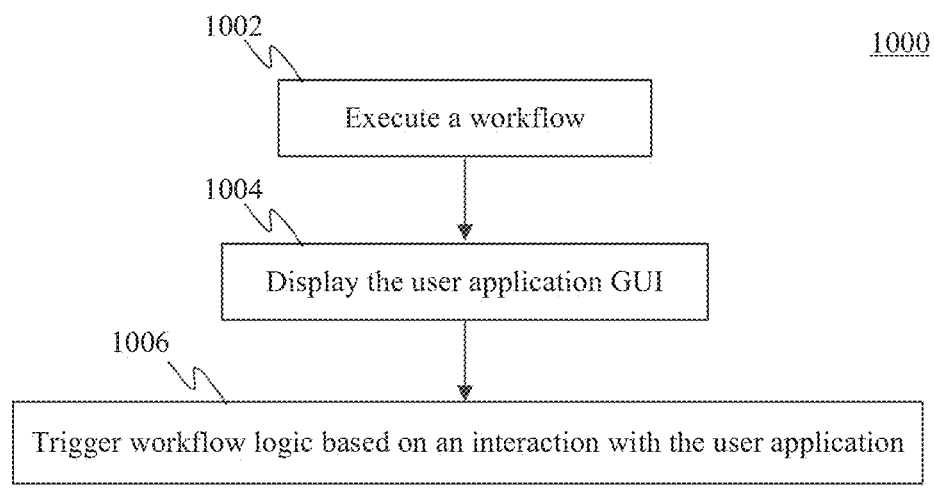
FIG. 10 shows a flowchart providing a process for executing a user application that includes one or more workflows, according to an example embodiment.

FIG. 10 shows a flowchart 1000 providing a process for executing workflow logic 120 of a workflow, according to an example embodiment. Flowchart 1000 is described as follows with respect to system 900 of FIG. 9 for illustrative purposes.

Flowchart 1000 begins with step 1002. In step 1002, the workflow is executed. In an embodiment, an end user at computing device 902 may cause workflow logic 120 to be executed, such as by command line, by clicking/tapping or otherwise interacting with an icon representing the application, by selection in a browser, or in another manner. As described above, workflow logic 120 may execute in workflow application 904 at computing device 902 and/or in workflow execution engine 906 at server 134. When executed, the workflow steps of workflow logic 120 are performed in the configured sequence. Accordingly, one or more of the workflow steps may make calls to corresponding applications/services to perform their functions, such as local application 122 (to return data 132), network-based application 124A (to return data 130A), network-based application 124B (to return data 130B), and/or other applications, local or network-based.

In step 1004, the workflow GUI is displayed. Step 1004 is optional, as in some embodiments, a GUI is not displayed for a workflow. In an embodiment, the GUI may be displayed by workflow application 904 at computing device 902. When displayed, the user may interact with the GUI by reviewing displayed data (e.g., from a file, database record, spreadsheet, or other data structure read by the workflow), by entering data into the GUI (e.g., by typing, by voice, etc.), and/or by interacting with one or more controls displayed by the GUI.

In step 1006, workflow logic is triggered based on an interaction with the workflow. Step 1006 is optional in cases where one or more workflow steps of a workflow require input from a user. In such cases, the user interacts with a control in a GUI of workflow application 904 associated with a workflow step of workflow logic 120 to provide information that triggers logic of the workflow step to operate.

In this manner, workflow logic 120 performs its functions, such as processing orders, tracking information, generating messages, processing documents to generate tasks or information, collecting feedback, and/or any other functions.

C. Example Embodiments for Receiving Input of Expressions and Other Information in a Same Input Control Embodiments are provided for configuring workflows and other types of applications to include user input fields that mix expressions with other types of information. For example, a workflow authoring/development system/tool may provide a graphical user interface (GUI) that enables the development of workflows. A displayed workflow step may be configured using the development tool to include a UI input control (e.g., a text entry box) into which information can be entered by a developer. In an embodiment, expressions and other information, such as literal text, may be entered into the UI input control in a mixed manner. The workflow step may be serialized to generate workflow logic (e.g., program code) that includes the expression and other information combined in the workflow step, indicates the respective types of the expression and the other information, indicates the output data type of the input control, and enables the expression to be evaluated during runtime and the expression results to be displayed intermixed with the other information. This workflow logic may be referred to as a serialized representation of the workflow step. The serialized workflow step may be deserialized to again be presented in the GUI for editing, with the expression and other information again presented in the UI input control.

The term "expression" as used herein refers to any type of expression, equation, dynamic content or syntax used to express a mathematical or logical relationship that includes one or more defined inputs (input data such as numerical values, variables, files, tables, arrays, databases, etc.) and one or more defined expressions/operations (e.g., mathematical operators, logical operators, string operators, etc.) to be performed on the one or more inputs to generate at least one output. The inputs and expressions/operations/formulas may be indicated as tokens in the workflow steps of the input control into which the expression is assembled/configured, or in another manner. An expression may be entered in a same input control with other information. Each instance of an expression and each instance of other information entered into a same input control is referred to as a segment, such that multiple segments are present in the input control. Each segment may be selected from a menu or other selector (e.g., as outputs of other segments or workflow steps), may be typed, dragged, or may be entered into the input control in any other manner.

The term "to serialize" or "serialization" as used herein refers to the process of translating or converting data structures (e.g., workflow steps having input controls configured with input information) into a format that can be stored (e.g., XML or other suitable language). Accordingly, the term "de-serialize" as used herein refers to the opposite operation, extracting the original data structure from the serialized format.

According to conventional techniques, if a user wanted to enter information into a single input control, the user would need to enter either static, literal text (i.e., text field) or an expression, but not both. Embodiments overcome this issue by receiving, from a user, a workflow definition that includes both literal text and expressions in a same input control (e.g., text box, field, line, etc.), in any number, combination, and order. In an embodiment, a developer's inputs into an input control are represented as an array of segments. Each segment may be displayed as a separate token, and has an associated data type.

In an embodiment, after a developer completes authoring an expression in a workflow step, a tokenized segment of the expression may be displayed in the workflow step, and the developer may then continue adding segments or writing as previously performed. As such, the workflow is represented cleanly, even when expressions or syntax are present. In an embodiment, the developer can combine and concatenate string literals onto expressions and calculations. Developers are able to navigate between segments using user interface components such as keyboard or mouse, and add/delete/update/upload each segment individually, or multiple segments at once. Additionally, the input controls also support copy/paste of segments, and the user/developer can paste them to anywhere where user inputs are accepted.

The user interface supports different types of segments and data types. For example, a 'FUNCTION' data type segment may represent user inputs that are function expressions; a 'LITERAL' data type segment may represent user inputs that are pure texts; an optional 'UNSUPPORTED' data type segment may represent valid input that the user interface does not currently support but knows is a valid input; and an optional 'UNKNOWN' data type segment may cover all other inputs for future proof including user error. In an embodiment, on load, parameter values are parsed to create an array of segments of possibly different data types. Collectively these segments provide enough information to convert back to developer inputs in their original form visually. For developer convenience, each segment is visualized differently. In an embodiment, if a segment output does not have a data type that matches the output data type of the corresponding workflow step, the workflow designer tool wraps the data value with the matching data type for correctness.

As noted above, when the workflow definition is serialized and stored, the workflow designer distinguishes between literal text and expressions, breaks down any expressions and stores them correctly as function segments, intermixed with the literal text segments as input by the developer. During deserialization, the user inputs are parsed and an array of segments is created that is the original mix of the different types of segments. Enough information is saved in each segment such that the array of segments can be converted back to user inputs as originally input. The segments may be displayed in the user interface and have different visuals (e.g., colors, labels, token shapes, etc.) for the user to distinguish them from each other, and optionally by data type.

Still further, embodiments provide a workflow definition that displays to a developer various selectable expression formats and displays the various segments/commands available (instead of requiring the developer to know or understand the expression language) to add an expression to a workflow definition. Current products with similar expression languages do not allow for this. In embodiments, the underlying expressions may be rendered on load, rendered after closing, reopened on pop-over, etc. Furthermore, the user may create a specific expression to use as an expression to add to a workflow definition.

According to embodiments, workflow designer 106 receives a workflow definition from developers that includes both literal and expression segments in a same input control of a workflow step. A literal segment input to a workflow step may be, for example, user-entered text or other string information. The literal input value does not change. An expression input represents a dynamic value that changes based on the instructions in the expression segment.

Any type of expression may be input to an input control. For example, and with reference to FIG. 1, an expression segment of a workflow step may form the sum of two dynamically changing values, add a value to the current date and time, etc. In other words, the expression segment may represent any expression as defined by the user. Furthermore, workflow designer 106 may dynamically display the expression segments for selection and placement by a user into an input control. Alternatively, the user may edit an expression or create their own.

Figure 11:
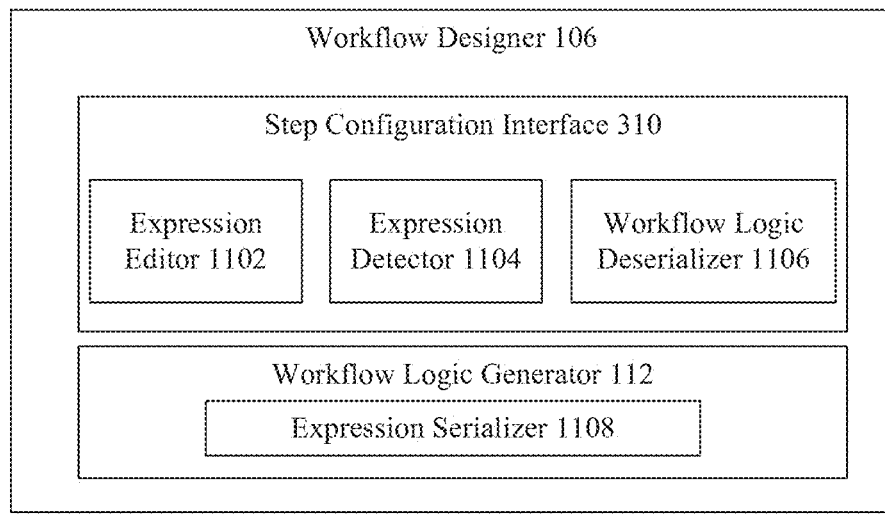
FIG. 11 shows a block diagram of a workflow designer configured to enable a user to configure workflow steps to include expressions mixed with other information, according to an example embodiment.

Embodiments for receiving input controls from developers that include a mixed input of expressions and other information may be configured in various ways. For example, FIG. 11 shows a block diagram of workflow designer 106 configured to receive, from a user, mixed inputs to form workflow steps, according to an example embodiment. Workflow designer 106 in FIG. 11 is an example of workflow designer 106 shown in FIGS. 1 and 3. As shown in FIG. 11, workflow designer 106 includes step configuration interface 310 and workflow logic generator 112. Step configuration interface 310 includes an expression editor 1102, an expression detector 1104, and a workflow logic deserializer 1106. Workflow logic generator 112 includes an expression serializer 1108. These and further features of FIG. 11 are described as follows.

Figure 12:
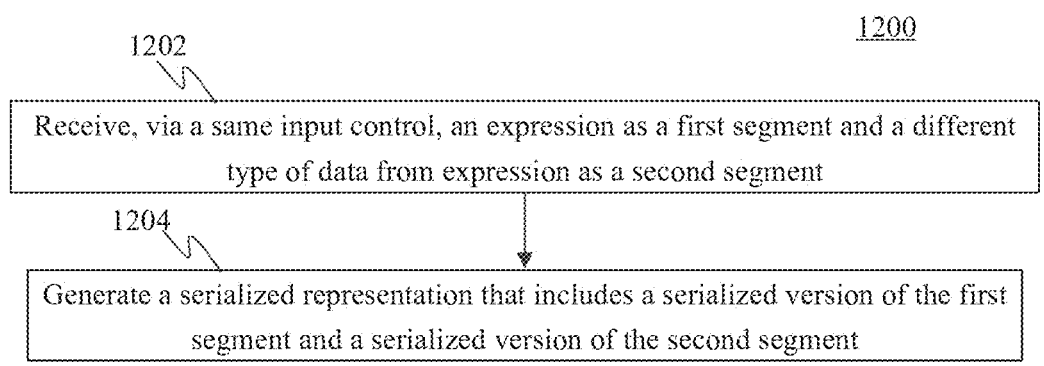
FIG. 12 shows a flowchart for receiving input controls that include expression segments mixed with other types of segments, according to an example embodiment.

In particular, workflow designer 106 of FIG. 11 is described with respect to FIG. 12 for illustrative purposes. FIG. 12 shows a flowchart 1200 for receiving input controls that mix expression segments with other types of segments, according to an example embodiment. Workflow designer 106 of FIG. 11 may operate according to flowchart 1200. Note that although flowchart 1200 is described in the context of workflows, flowchart 1200 and other embodiments described herein are applicable to other types of applications. Furthermore, note that not all steps of flowchart 1200 need to be performed in all embodiments. Flowchart 1200 is described as follows.

Flowchart 1200 begins with step 1202. In step 1202, an expression as a first segment and a different type of data from expression as a second segment are received via a same input control. For instance, and with reference to FIG. 11 (and further to the description above with respect to steps 204 and 206 of FIG. 2), when a workflow step is opened for editing by workflow designer 106, step configuration interface 310 is configured to enable a developer to modify or create a workflow step in a user interface control of the workflow step. Step configuration interface 310 may receive one or more segments, such as literal text, expressions, etc. in a workflow input control. In an embodiment, expression editor 1102 of step configuration interface 310 is invoked to generate an expression configuration control to receive an expression segment input by the developer. In one example, a set of segments input to a workflow control via step configuration interface 310 includes a first segment that is an expression segment (e.g., that is input to the workflow input control using an expression configuration control) and a second segment that is not an expression segment (e.g., a literal text segment typed into the workflow input control). The expression segment includes an expression that operates on one or more input values to generate an output value during runtime. Examples of input controls and received segments are described in further detail below. Note that the segments may input to the workflow input control in any order.

In step 1204, a serialized representation that includes a serialized version of the first segment and a serialized version of the second segment are generated. For instance, and with reference to FIG. 11, workflow logic generator 112 is configured to generate serialized versions of information input into input controls, including generating a serialized version of each input segment. Expression serializer 1108 of workflow logic generator 112 is configured to serialize any expression segments in an input control. The serialized versions may have any form, including the form of program code (e.g., XML (extensible markup language) code, C++ code. C# code. JavaScript code, etc.). The serialized versions may be operated at runtime (e.g., as described above with respect to FIGS. 9 and 10), during which time, any expression segment executes and generates output data according to its configuration. The serialized representation of an input control includes serialized versions of any expressions and literal text. A serialized version of an expression segment includes the expression in program code executable form (formatted according to the particular programming language), and may indicate a data type of the expression (e.g., "FUNCTION"). A serialized version of a literal text segment includes the literal text (e.g., in parenthesis) in program code, and may indicate a data type of the literal text (e.g., "LITERAL"). The serialized representation includes the expressions and literal text in the program code in the order in which the corresponding segments were entered in the input control.

Following the illustrative example noted above, where first and second segments (expression and literal text) were entered by a developer into an input control, the serialized version of the first segment (expression) is executable during runtime to evaluate an output value of the expression based on the corresponding input values received during runtime. The serialized version of the second segment (literal text) cause the literal text to be displayed. The instances of expression results and literal text are displayed in the order in which they the corresponding expression segments and literal text segments are arranged by a developer in the input control.

In an embodiment, the serialized representation of the workflow step is stored in workflow logic. For instance, and with reference to FIG. 11, workflow logic generator 112 includes workflow logic storage that stores serialized representations of one of more workflow steps.

As described above, and with reference to FIGS. 5-8, a developer may select workflow steps for inclusion in the workflow that may be associated with network-based applications and/or local applications. As such, once a workflow step is added to the workflow, the developer may further configure each workflow step by adding, modifying or deleting segments. As noted above, each segment may be a literal text segment, an expression segment, or other type of segment. In one embodiment, to begin to configure a workflow step, the developer clicks in the workflow step. In response to the developer clicking inside an input control of the workflow step, an add dynamic content button may be displayed beneath the input control. The developer may use the add dynamic content button to select and input an expression in the workflow step. The expression segment may contain dynamic content (e.g., input from Office365 or DropBox) and an expression (e.g., add expression, subtract expression). In an embodiment, the developer may input literal text as a segment in the workflow step and as noted above, the developer may intermingle literal text segments and dynamic segments in the same workflow step.

In an embodiment, to begin inputting an expression into a workflow control, a developer may first interact with a user interface element (e.g., an "add dynamic content" button) to add an expression. In response to a selection of the UI element, a dynamic content list or an expression list appears in the browser window. Alternatively, when editing of the workflow begins, the dynamic content list or expression list may automatically be displayed in the browser window. As such, the developer can first select, search, or input an expression segment into the workflow definition. Alternatively, the developer may type the expression into the workflow control using a keyboard, may enter the expression by voice, or may enter the expression in another manner.

Figure 13:
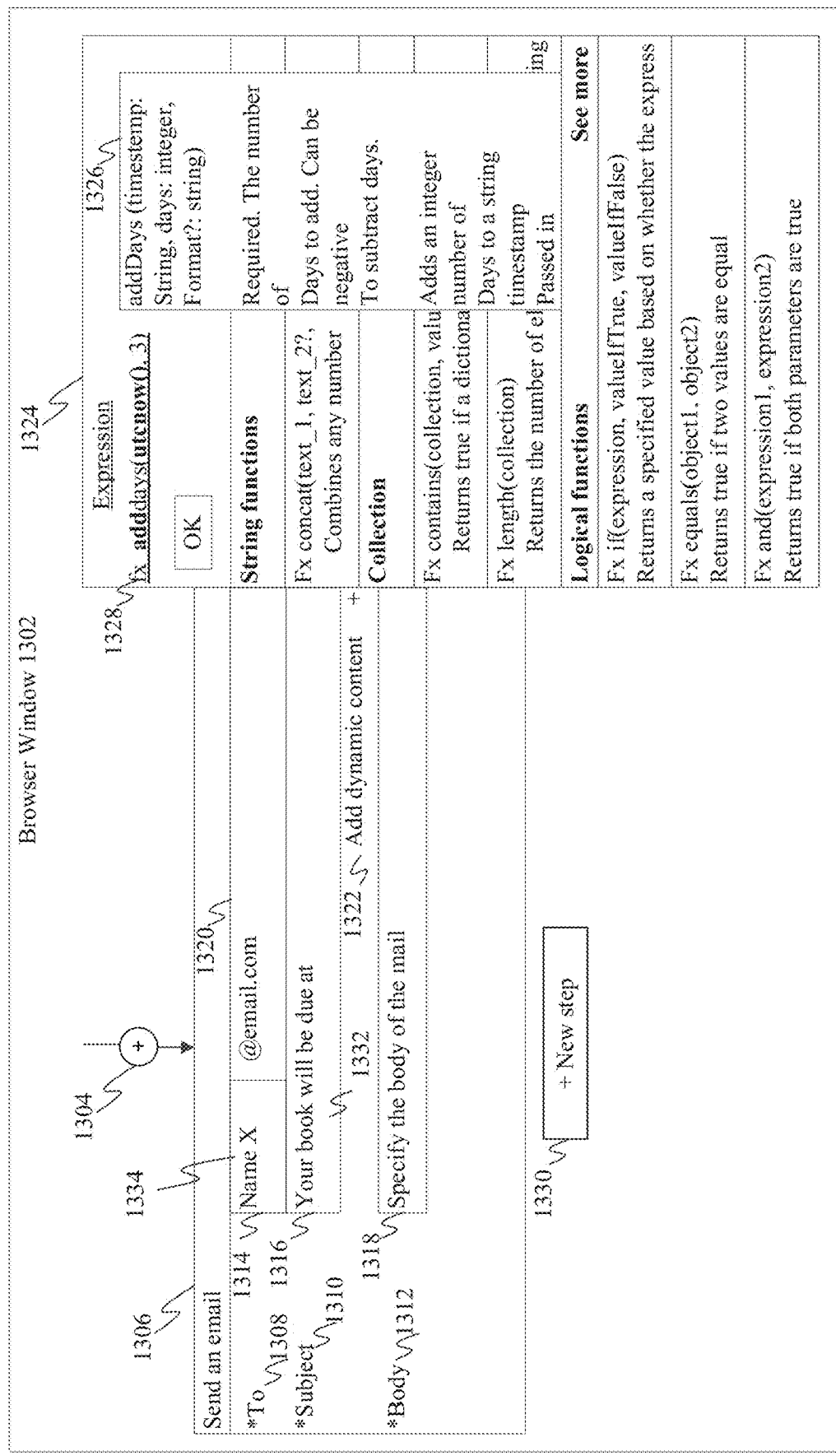
FIGS. 13-14 show views of user interfaces for receiving inputs to configure workflow steps that include expression segments, according to an example embodiment.
Figure 14:
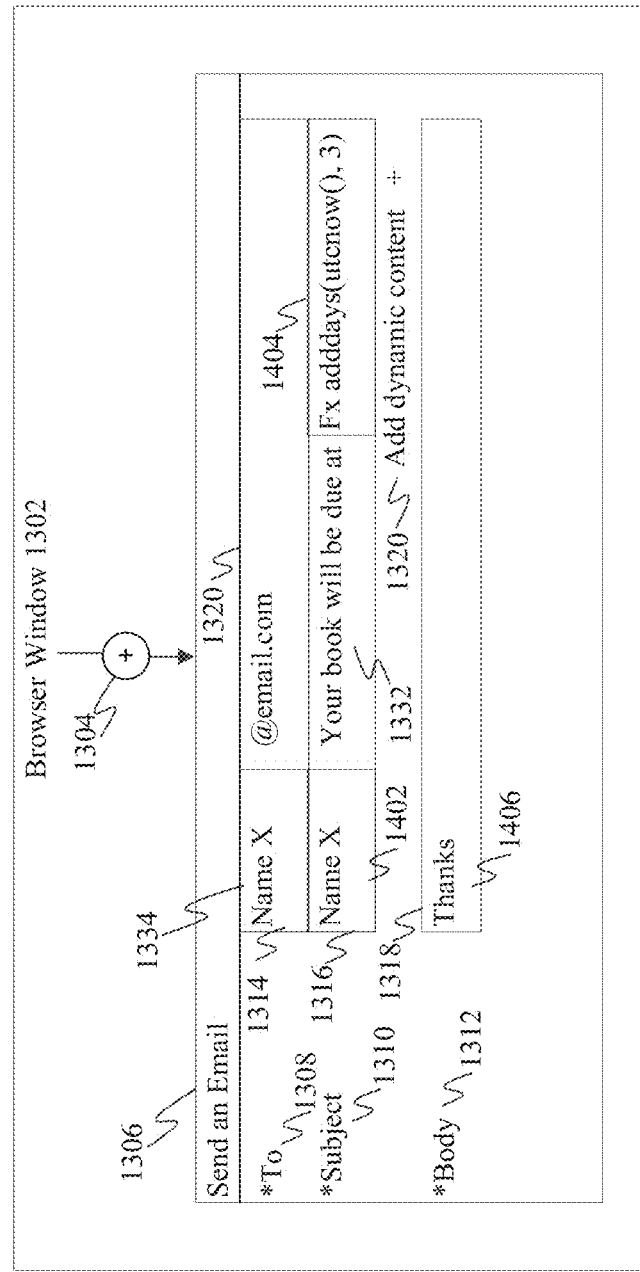

Reference is made to FIGS. 13-14 to illustrate an example implementation of flowchart 1200 and operation of workflow designer 106 to configure workflow step inputs. FIG. 13 shows a browser window 1302 for receiving inputs to configure workflow steps including expression segments, according to an example embodiment. Browser window 1302 is displayed in a display screen of a computing device, such as display screen 108 in FIG. 4.

Browser window 1302 generates for display a workflow step 1306 entitled "Send an email" initiated by interfacing with new step button 1304. New step button 1304 enables the developer to add new steps to a workflow, including workflow step 1306, similar to add interface 504 described above with respect to FIG. 5. New step button 1330 similarly enables new workflow steps to be added subsequent to workflow step 1306. Browser window 1302 displays a first label 1308, a second label 1310, and a third label 1312. As shown in FIG. 13, labels 1308, 1310, and 1312 are labels of "To", "Subject," and "Body," corresponding to first-third input text boxes 1314, 1316, and 1318, which are input controls for entering information. Accordingly, first input text box 1314 is a text box for receiving information defining one or more target persons for sending an email, second input text box 1316 is a text box for receiving information defining a subject of the email, and third input text box 1318 is a text box for receiving information defining an email body.

As shown in FIG. 13, an input name segment 1334 and literal text segment 1320 are entered in first input text box 1314 (e.g., by a user). Input name segment 1334 may be a token for an input data "name" to be received from a preceding workflow step (or elsewhere) during runtime. Literal text segment 1320 is shown as "@email.com", which is text that appends to the input name received for input name segment 1334 during runtime, to provide a complete email address for first input text box 1314. A literal text segment 1332 is entered in second input text box 1316. Literal text segment 1323 is shown as "Your book will be due at", which is a portion of the subject line input in second input text box 1316. Third input text box 1318 does not yet have an email body entered (instead showing default text in FIG. 13).

Browser window 1302 also displays a user selectable button 1322 beneath second input text box 1316. As noted above, in an embodiment, when a developer selects an input control or text box, an "add dynamic content" button may be displayed present under the input control such that the developer is enabled to add an expression to the corresponding input control.

In the example of FIG. 13, a developer interacted with user selectable button 1322 to cause browser window 1302 displays an expression configuration control 1324. Expression configuration control 1324 enables a user to input an expression to the active workflow input control, which in the example of FIG. 13 is second input text box 1316. As noted above, selectable expressions may be an output from a prior workflow step or application ("Dynamic content") or an expression ("Expression"; also referred to herein as operands). As shown in the example of FIG. 13, expression configuration control 1324 may display expressions by category, although in other embodiments, expression selector 1324 may be configured in other ways. For example, string functions, collection, and logical functions categories may be listed that the developer may select from, to include an expression in the active input control. However, in other embodiments, other categories of expressions may be presented. The developer may select an expression from the displayed expressions, to cause the expression to be entered into the active input control. Once in the input control, the selected expression may be edited by the developer. Alternatively, the developer may enter an original expression into an input control manually without interacting with expression configuration control 1324.

In one example, the developer may click on an example expression and click on an "OK" button to add the example expression to the workflow definition as a expression. Alternatively, the developer may select an expression in another way. For example, the developer may make a selection for an expression "contains(collection,value)." In another example, the developer may make a selection for "length (collection)." Expression configuration control 1324 may be scrolled down, paged down (or up), or otherwise navigated to display expressions for selection.

For example, as shown in FIG. 13, expression configuration control 1324 also includes a search bar 1328. The developer may search for expressions by using search input box 1328. For instance, and as shown in FIG. 13, the developer may search for expression "adddays(utcnow( ), )" by typing "add" into search input box 1328.

Once an expression is selected, the developer may be enabled to configure the expression, such as be selecting inputs (from prior workflow steps or elsewhere), setting variables, and/or otherwise configuring the expression. For example, the developer desire to configure the adddays (utcnow( ),) function. Such configuration may be performed prior to or after selecting the expression for inclusion in the workflow step. In an embodiment, an expression description 1326 may be displayed that indicates parameters of the selected expression for configuring. For instance, expression description 1326 may indicate a "days' parameter as a required input, indicating a number of days to add to a runtime date value. In the example of FIG. 13, the developer populated the "days" parameter (number of days to add) with the number of "3."

FIG. 14 shows browser window 1302 with additional information entered into the input controls of workflow step 1306, according to an embodiment. As shown in FIG. 14, an input name segment 1402 is entered into second input text box 1316 prior to literal text segment 1332, and the expression selected in FIG. 13 is entered into second input text box 1316 after literal text segment 1332 as expression segment 1404. Furthermore, a literal text segment 1406 shown as "Thanks" is entered into third input text box 1318 as the email body of the email to be sent during runtime of workflow step 1306.

Input name segment 1402 is the same as input name segment 1334, being a token for the same input data "name" as input name segment 1334 to be received from a preceding workflow step (or elsewhere) during runtime. Furthermore, expression segment 1404 is configured to be evaluated at runtime, to calculate a date 3 days after the current date at runtime. Input name segment 1402 has a data type of literal text (a name string), literal text segment 1332 has a data type of literal text, and expression segment 1404 has a data type of function. Accordingly, second text input box 1316 contains three segments of data type literal, literal, and function, in series. At runtime, workflow step 1306 will receive the name associated with input name segments 1334 and 1402 and evaluate the expression of expression segment 1404 to fully populate an email generated by workflow step 1306. Workflow step 1306 as shown in FIG. 14 may be serialized, and implemented in workflow logic, as described elsewhere herein.

At runtime of the workflow logic, an email address is generated from the segments in first input text box 1314 (the received name appended with @email.com), a subject line of the email is generated from the segments in second input text box 1316 (the received name, appended with "Your book will be due at", appended with the calculated data of current date+3), and the email body of the email is generated to contain "Thanks." The email may be sent to the generated email address, with the generated subject line and email body, to inform the recipient that a book they checked out (e.g., from a library) is due on the calculated date. For instance, if the current date is Dec. 20, 2017 and the received name is Chris, the generated email is transmitted to: "Chris@email.com," with the subject line "Chris, Your book will be due at Dec. 23, 2017." and the email body of "Thanks." Thus, workflow step 1306 may be implemented by a library or other entity that enables books to be borrowed, to remind the book recipients of the book due date.

FIGS. 13 and 14 are provided to show an exemplary workflow step with an input control configured to received mixed input of expressions and literal text, and are not intended to be limiting. A workflow step may have any number and types of input controls in any position and of any size in the workflow step that each receive any combination of one or more expressions and one or more other types of segments. Any type of user interface element (e.g., a pulldown menu, a pop-up menu, etc.) may be provided to enable a developer to input and configure an expression. Alternatively, a developer may be enabled to manually input an expression.

Figure 15:
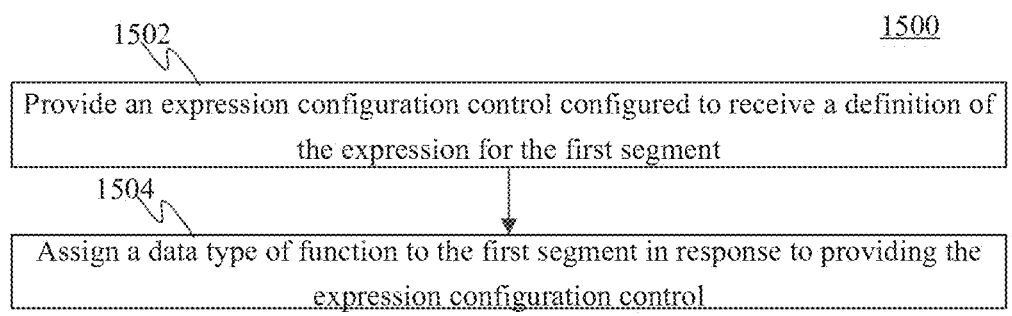
FIG. 15 shows a flowchart for receiving a definition of an expression in a workflow control with a manually assigned data type, according to an example embodiment.

Various processes are described as follows that may be performed by workflow designer embodiments described herein, as well as being implemented in flowchart 1200 of FIG. 12. For instance, FIG. 15 shows a flowchart 1500 for receiving a definition of an expression in a workflow control with a manually assigned data type, according to an example embodiment. Flowchart 1500 may be implemented by expression editor 1102 of FIG. 11, in an embodiment. Flowchart 1500 is described as follows. Other structural and operational embodiments will be apparent to persons skilled in the relevant art(s) based on the following discussion regarding flowchart 1500.

Flowchart 1500 begins with step 1502. In step 1502, a definition of the expression is received for the first segment. For example, in an embodiment, expression editor 1102 receives, from a developer, a definition of expression in an input control. For instance, expression editor 1102 may generate an expression configuration control, such as expression configuration control 1324 of FIG. 13, such that the developer can make selections to configure an expression. Alternatively, the developer may manually configure an expression in an input control (e.g., in a text box) via expression editor 1102.

In step 1504, a data type of function is assigned to the first segment. In an embodiment, expression editor 1102 may assign a data type of function to an expression, such as expression segment 1404 shown in FIG. 14. Expression editor 1102 may assign the data type of function to an expression in various ways. For example, in step 1504, the data type of function may automatically be assigned to an expression by expression editor 1102 due to the developer selecting and placing the expression in an input control from an expression selector (such as expression configuration control 1324). The data type of function may be indicated for the first segment in a visual manner (e.g., a color of the function in the input control, a function system (e.g., fx) next to the function in the input control, showing the function as a function token in the input control, etc.

Alternatively, expression detector 1104 of FIG. 11 may be present to automatically detect a definition of an expression in an input control. For example, expression detector 1104 may be configured to automatically detect an expression input into an input control. For instance, in one embodiment, expression detector 1104 may parse the contents of input controls, and indicate a found segment as an expression due to finding indications of an expression in the segment (e.g., functions and/or function symbols such as "+", "−", "/", "x", "=", "cosine", "sin", etc.), a function attribute manually applied to the expression (e.g., as indicated by brackets, etc.), and/or determine the presence of a function in another manner. In response to expression detector 1104 detecting an expression in an input control, expression editor 1102 may assign the data type of function to the expression, and the data type of function may be indicated for the first segment in a visual manner (e.g., a color of the function in the input control, a function system (e.g., fx) next to the function in the input control, showing the function as a function token in the input control, etc.

In embodiments, and as noted above, when a workflow step is configured and saved in a workflow, workflow designer 106 may generate a serialized representation of the workflow. The serialized representation of the workflow includes serialized versions of each segment in the array of segments. Furthermore, the serialized representation of the workflow is stored such that the serialized representation can be deserialized and executed at runtime to output an output data type. Each workflow step input control has an output data type, and thus, if an expression is a present in a workflow step, the output data type of the expression needs to match the output data type of the workflow input control, or the output data type of the expression has to be converted to the output data type of the workflow input control. In an embodiment, during the serialization process, workflow designer 106 is configured to wrap the expression segment with the output data type of the input control to match the output data types.

Figure 16:
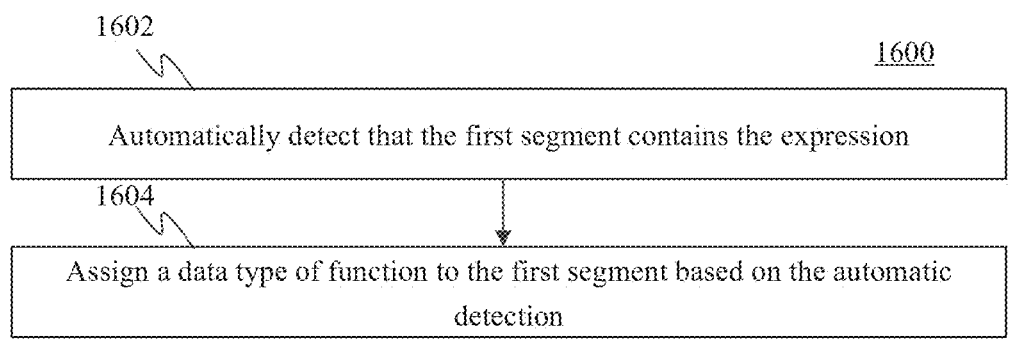
FIG. 16 shows a flowchart for generating a serialized representation that includes a serialized version of the first segment and a serialized version of the second segment, according to an example embodiment.
Figure 17:
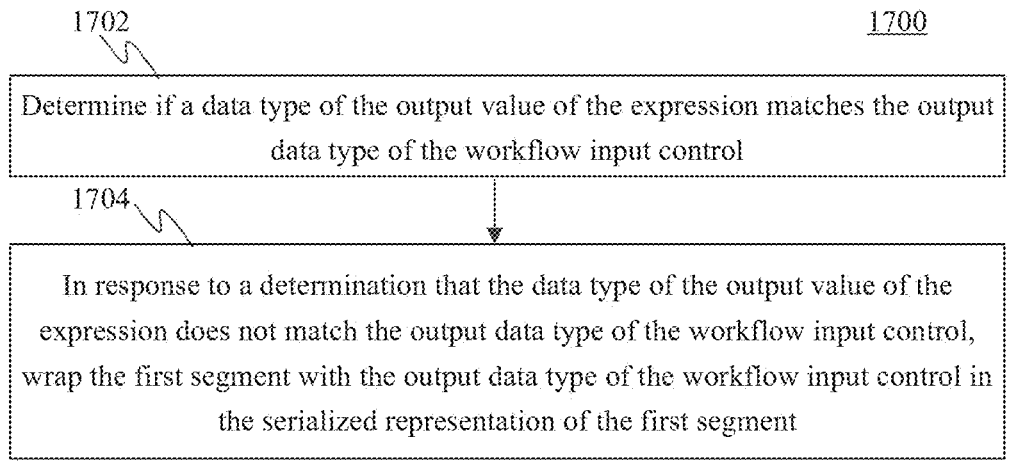
FIG. 17 shows a flowchart for generating a serialized representation of an expression to have a data type matching that of a workflow control in which the expression is entered, according to an example embodiment.

For instance, FIG. 16 shows a flowchart for generating a serialized representation that includes a serialized version of the first segment and a serialized version of the second segment, and FIG. 17 shows a flowchart 1700 for generating a serialized representation of an expression to have a data type matching that of a workflow control in which the expression is entered, according to an example embodiment. Flowchart 1600 and flowchart 1700 may be implemented by expression serializer 1108 of FIG. 11, in embodiments. FIGS. 16 and 17 are described as follows. Other structural and operational embodiments will be apparent to persons skilled in the relevant art(s) based on the following discussion regarding flowcharts 1600 and 1700.

Before beginning flowcharts 1600 and 1700, an exemplary serialized representation of workflow step 1306 (FIG. 14), which may be generated during step 1204 of FIG. 12, is shown below:

```
"method": "post",
"path": "/Mail",
"body": {
    "To": "@triggerBody( )?['Name']}@email.com",
    "Subject": "@triggerBody( )?['Name']}, your book will be due at @{addays)utcnow( ), 3)}",
    "Body": "Thanks"
}
```

At runtime of the above serialized workflow logic, an email is defined, with the label of "To" preceding the email address generated from the segments in first input text box 1314 (the received name appended with d@email.com), the label of "Subject" preceding the subject line generated from the segments in second input text box 1316 (the received name, appended with "Your book will be due at", appended with the expression that evaluates the current date+3), and the label of "Body" preceding the email body containing "Thanks." In particular, expression segment 1404 is represented in serialized form by:

@{addays)utcnow( ), 3)}

In this example, the @ symbol identifies dynamic content. Note that data type may be indicated with serialized versions of segments in any form. For example, in a serialized representation, data types may be indicated for segments received in an input control as follows for the example of input text box 1316 of FIG. 14:

```
{type: 'LITERAL', value: @triggerBody( )?['Name']}
{type: 'LITERAL', value: your book will be due at}
{type: 'FUNCTION', value: @{addays)utcnow( ), 3)}
```

In the above example, the corresponding data type is expressly stated for each segment.

Flowchart 1600 begins with step 1602. In step 1602, the expression of the first segment is formatted. For example, in an embodiment, expression serializer 1108 formats an expression segment. For instance, as shown above, expression serializer 1108 formats function segment @{addays) utcnow( ), 3)}" to {type: 'FUNCTION', value: @{addays) utcnow( ), 3)}.

In step 1604, the literal text of the second segment is identified. For example, in an embodiment, expression serializer 1108 identifies the literal text of the second segment. For instance, as shown above, expression serializer 1108 identifies literal segment "your book will be due at" and stores the literal segment as {type: 'LITERAL', value: your book will be due at}.

Flowchart 1700 begins with step 1702. In step 1702, whether a data type of the output value of the expression matches the output data type of the workflow input control is determined. For instance, in an embodiment, expression serializer 1108 of FIG. 11 may determine if a data type of the output value of an expression segment matches the output data type of the input control in which the expression segment resides. If they match, operation of flowchart 1700 ends. If they do not match, operation proceeds from step 1702 to step 1704.

In further detail, segments entered into an input control are each assigned a data type, which in an embodiment may be those described above: LITERAL, FUNCTION, UNKNOWN, or UNSUPPORTED (UNKNOWN and UNSUPPORTED are optional data types for segments). These data types enable identification of the segments in the input controls for a visual indication of the segments (e.g., via color, symbols, etc.) and enable proper treatment of the segments in the serialized representation. In an embodiment, a default data type (e.g., LITERAL) is assigned to segments entered into an input control. The FUNCTION data type is assigned to a expression segment entered into an input control in another manner, such as by the selection tool for the expression, or by being determined by parsing the segments in the input control, as described above. Furthermore, an expression and an input control each have an output data type. Examples of such output data types for expressions and input controls include STRING, NUMBER, OBJECT, BOOLEAN, ANY, etc. The output data type of an expression is the data type of the results of the evaluation of the expression or formula, which may be a string of text (STRING), a number result (NUMBER), a Boolean value of 1 or 0 (BOOLEAN), etc. The output data type of the input control is the desired output type for all contents of the input control (e.g., segments) during runtime. According to step 1702, if the output data type of an expression segment, such as BOOLEAN, does not match the output data type of the input control in which the expression segment resides, such as STRING, operation proceeds from step 1702 to step 1704.

In step 1704, in response to a determination that the data type of the output value of the expression does not match the output data type of the workflow input control, the first segment is wrapped with the output data type of the workflow input control. For instance, if expression serializer 1108 determines that the data type of the output value of an expression segment does not match the output data type of the input control, expression serializer 1108 wraps an expression segment with the output data type of the input control.

Wrapping an expression segment with the output data type of the input control may be a forced conversion of the expression segment output data type to that of the input control. For instance, if an expression segment has an output data type of BOOLEAN, and the output data type of the input control is STRING, expression serializer 1108 wraps the output of the data type of the expression segment to STRING (e.g., converting a Boolean output of 1 or 0 to a string output of 1 or 0). In this manner, if several segments of various output data types are present in an input control, the output data types of the segments that do not match the output data type of the input control are each wrapped in the output data type of the input control by expression serializer 1108.

After a serialized representation of a workflow step is generated, a developer may further desire to configure the workflow step, which may entail editing one or more segments in an input control of the workflow step. Embodiments enable serialized representations of workflow steps to be deserialized for further configuring. This includes using the data type information of the segments preserved in the serialized representation to re-display the segments in the same manner as they were previously entered by a developer.

For instance, flowchart 1800 shows a flowchart for deserializing a serialized workflow step containing an expression, according to an example embodiment. Flowchart 1800 may be implemented by step configuration interface 310 of FIG. 11, in embodiments. Other structural and operational embodiments will be apparent to persons skilled in the relevant art(s) based on the following discussion regarding flowchart 1800.

In step 1802, the serialized representation is loaded. For instance, and with reference to FIG. 11, workflow logic deserializer 1106 loads workflow logic 120 (FIG. 3) which includes a serialized representation of at least one expression segment generated by expression serializer 1108.

In step 1804, the serialized representation of the first segment is deserialized into the first segment. For instance, and with reference to FIG. 11, workflow logic deserializer 1106 is configured to deserialize workflow logic 120, including deserializing the serialized representation of any expressions included in workflow logic 120 into their corresponding expression segments. Deserialization by workflow logic deserializer 1106 entails parsing the program code defining workflow logic 120 to identify each input control of each defined workflow step (e.g., by corresponding identifiers), and identifying the segments filling each workflow step and their corresponding data types. For input controls containing segments of different data types, including expression segments, workflow logic deserializer 1106 identifiers the separate segments and their corresponding data types (e.g., by segment identifiers, symbols, tags, etc., for each data type of segment).

In step 1806, the input control is re-filled with the first segment and the second segment. For instance, and with reference to the illustrative example of FIGS. 11 and 14, step configuration interface 310 re-displays workflow step 1306, including filling input text boxes 1314, 1316, and 1318 with tokens or other representations of their corresponding segments. In particular, input text box 1314 is filled with input name segment 1334 and literal text segment 1320, input text box 1316 is filled with input name segment 1402, literal text segment 1332, and expression segment 1404, and input text box 1318 is filled with literal text segment 1406. Accordingly, the developer is enabled to further configure workflow step 1306, including being enabled to edit the segments in each input control as before.

III. Example Mobile and Stationary Device Embodiments

Figure 18:
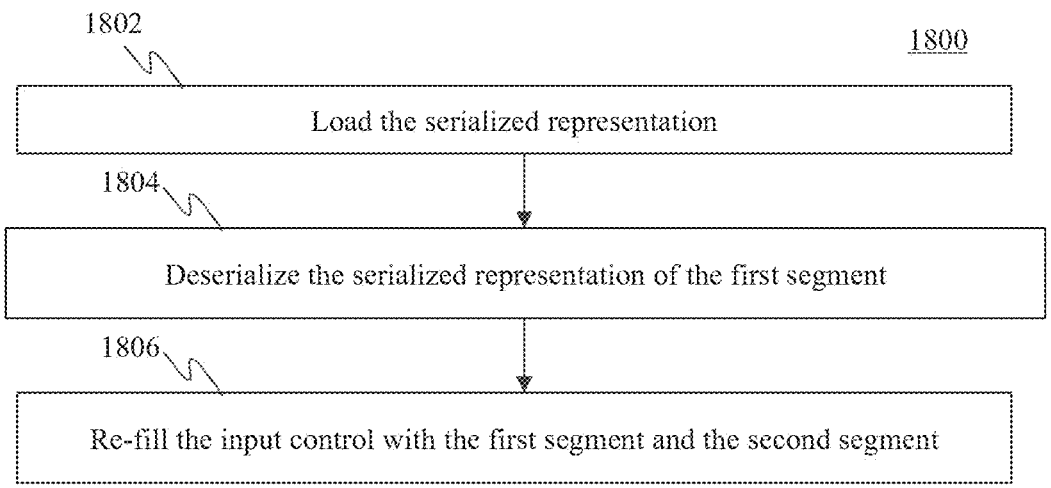
FIG. 18 shows a flowchart for deserializing a serialized workflow step containing an expression, according to an example embodiment.

Computing device 102, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration interface 310, workflow definition generator 312, interface definition generator 314, computing device 902, workflow application 904, workflow execution engine 906, expression editor 1102, expression detector 1104, workflow logic deserializer 1106, expression serializer 1108, flowchart 200, flowchart 1000, flowchart 1200, flowchart 1300, flowchart 1400, flowchart 1500, flowchart 1600, and the FIGS. 17-18 may be implemented in hardware, or hardware combined with software and/or firmware. For example, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration interface 310, workflow definition generator 312, interface definition generator 314, computing device 902, workflow application 904, workflow execution engine 906, expression editor 1102, expression detector 1104, workflow logic deserializer 1106, expression serializer 1108, flowchart 200, flowchart 1000, flowchart 1200, flowchart 1300, flowchart 1400, flowchart 1500, flowchart 1600 and/or FIGS. 17-18 may be implemented as computer program code/instructions configured to be executed in one or more processors and stored in a computer readable storage medium. Alternatively, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration interface 310, workflow definition generator 312, interface definition generator 314, computing device 902, workflow application 904, workflow execution engine 906, expression editor 1102, expression detector 1104, workflow logic deserializer 1106, expression serializer 1108, flowchart 200, flowchart 1000, flowchart 1200, flowchart 1300, flowchart 1400, flowchart 1500, flowchart 1600 and/or FIGS. 17-18 may be implemented as hardware logic/electrical circuitry.

For instance, in an embodiment, one or more, in any combination, of workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration interface 310, workflow definition generator 312, interface definition generator 314, computing device 902, workflow application 904, workflow execution engine 906, expression editor 1102, expression detector 1104, workflow logic deserializer 1106, expression serializer 1108, flowchart 200, flowchart 1000, flowchart 1200, flowchart 1300, flowchart 1400, flowchart 1500, flowchart 1600 and/or FIGS. 17-18 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 19:
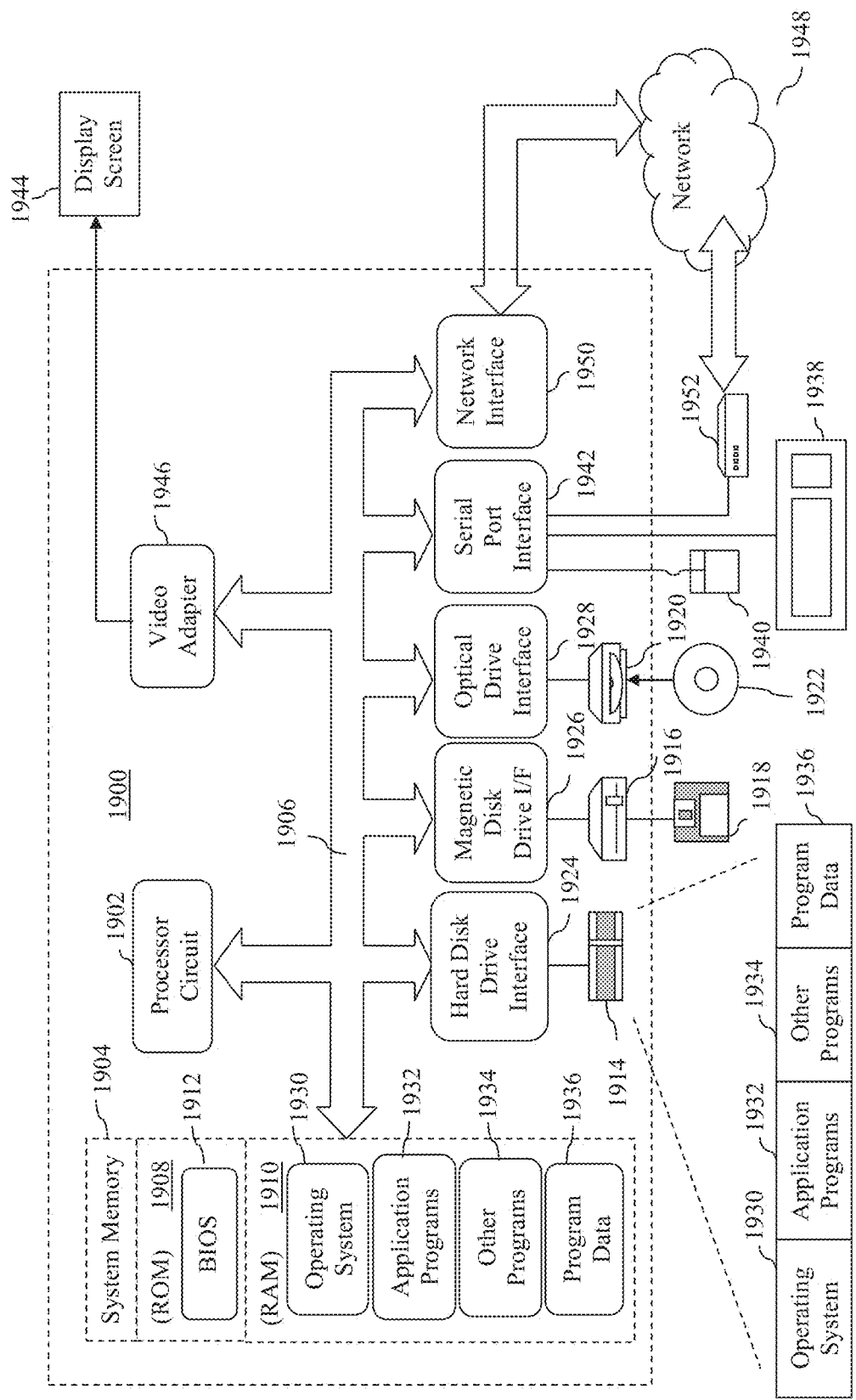
FIG. 19 shows a block diagram of an example computing device that may be used to implement embodiments.

FIG. 19 depicts an exemplary implementation of a computing device 1900 in which embodiments may be implemented. For example, any of computing device 102, and server 134 may be implemented in one or more computing devices similar to computing device 1900 in stationary or mobile computer embodiments, including one or more features of computing device 1900 and/or alternative features. The description of computing device 1900) provided herein is provided for purposes of illustration, and is not intended to be limiting. Embodiments may be implemented in further types of computer systems, as would be known to persons skilled in the relevant art(s).

As shown in FIG. 19, computing device 1900 includes one or more processors, referred to as processor circuit 1902, a system memory 1904, and a bus 1906 that couples various system components including system memory 1904 to processor circuit 1902. Processor circuit 1902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1902 may execute program code stored in a computer readable medium, such as program code of operating system 1930, application programs 1932, other programs 1934, etc. Bus 1906 represents one or more of any of several types of bus structures, including a memory bus or memory controller, a peripheral bus, an accelerated graphics port, and a processor or local bus using any of a variety of bus architectures. System memory 1904 includes read only memory (ROM) 1908 and random access memory (RAM) 1910. A basic input/output system 1912 (BIOS) is stored in ROM 1908.

Computing device 1900 also has one or more of the following drives: a hard disk drive 1914 for reading from and writing to a hard disk, a magnetic disk drive 1916 for reading from or writing to a removable magnetic disk 1918, and an optical disk drive 1920 for reading from or writing to a removable optical disk 1922 such as a CD ROM, DVD ROM, or other optical media. Hard disk drive 1914, magnetic disk drive 1916, and optical disk drive 1920 are connected to bus 1906 by a hard disk drive interface 1924, a magnetic disk drive interface 1926, and an optical drive interface 1928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1930, one or more application programs 1932, other programs 1934, and program data 1936. Application programs 1932 or other programs 1934 may include, for example, computer program logic (e.g., computer program code or instructions) for implementing workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration interface 310, workflow definition generator 312, interface definition generator 314, computing device 902, workflow application 904, workflow execution engine 906, expression editor 1102, expression detector 1104, workflow logic deserializer 1106, expression serializer 1108, flowchart 200, flowchart 1000, flowchart 1200, flowchart 1300, flowchart 1400, flowchart 1500, flowchart 1600, and/or further embodiments described herein.

A user may enter commands and information into the computing device 1900 through input devices such as keyboard 1938 and pointing device 1940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1902 through a serial port interface 1942 that is coupled to bus 1906, but may be connected by other interfaces, such as a parallel port, game port, or a universal serial bus (USB).

A display screen 1944 is also connected to bus 1906 via an interface, such as a video adapter 1946. Display screen 1944 may be external to, or incorporated in computing device 1900. Display screen 1944 may display information, as well as being a user interface for receiving user commands and/or other information (e.g., by touch, finger gestures, virtual keyboard, etc.). In addition to display screen 1944, computing device 1900 may include other peripheral output devices (not shown) such as speakers and printers.

Computing device 1900 is connected to a network 1948 (e.g., the Internet) through an adaptor or network interface 1950, a modem 1952, or other means for establishing communications over the network. Modem 1952, which may be internal or external, may be connected to bus 1906 via serial port interface 1942, as shown in FIG. 19, or may be connected to bus 1906 using another interface type, including a parallel interface.

As used herein, the terms "computer program medium," "computer-readable medium," and "computer-readable storage medium" are used to refer to physical hardware media such as the hard disk associated with hard disk drive 1914, removable magnetic disk 1918, removable optical disk 1922, other physical hardware media such as RAMs. ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1932 and other programs 1934) may be stored on the hard disk, magnetic disk, optical disk. ROM. RAM, or other hardware storage medium. Such computer programs may also be received via network interface 1950, serial port interface 1942, or any other interface type. Such computer programs, when executed or loaded by an application, enable computing device 1900 to implement features of embodiments discussed herein. Accordingly, such computer programs represent controllers of the computing device 1900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In a first embodiment, a system is implemented in a computing device and configured to enable a user to configure a workflow step. The system includes a processor; and a memory that stores program code configured to be executed by the processor. The program code comprises a step configuration interface configured to receive, via a same input control, an expression as a first segment and a different type of data from an expression as a second segment. The program code further comprises a logic generator configured to generate a serialized representation that includes a serialized version of the first segment and a serialized version of the second segment.

In one embodiment of the foregoing system, the step configuration interface comprises: an expression editor configured to provide an expression configuration control configured to receive a definition of the expression for the first segment, and to assign a data type of function to the first segment in response to providing the expression configuration control.

In an embodiment, the step configuration interface comprises: an expression detector configured to automatically detect that the first segment contains the expression and to assign a data type of function to the first segment based on the automatic detection.

In another embodiment of the foregoing system, the program code further comprises an execution engine configured to, at runtime, generate a result of the expression based on received input data.

In another embodiment of the foregoing system, the input control has an output data type and the logic generator comprises an expression serializer configured to generate the serialized version of the first segment, the expression serializer configured to wrap the first segment with the output data type of the input control in response to determining that a data type of an output value of the expression does not match the output data type of the input control.

In another embodiment of the foregoing system, the serialized representation of the first segment comprises program code for the expression and indicates a data type of function for the first segment.

In another embodiment of the foregoing system, the step configuration interrace is configured to load the serialized representation, the step configuration interface comprising an expression deserializer configured to deserialize the serialized version of the first segment, and the step configuration interface is configured to refill the input control with the first segment and the second segment.

A method in a computing device is described herein. The method includes receiving, via a same input control, an expression as a first segment and a different type of data from expression as a second segment; and generating a serialized representation that includes a serialized version of the first segment and a serialized version of the second segment.

In one embodiment of the foregoing method, the method further comprises: providing an expression configuration control configured to receive a definition of the expression for the first segment; and assigning a data type of function to the first segment in response to providing the expression configuration control.

In another embodiment of the foregoing method, wherein said receiving comprises: automatically detecting the first segment contains the expression; and assigning a data type of function to the first segment based on the automatic detection.

In another embodiment of the foregoing method, the method further comprises executing the expression at runtime based on received input data to generate a result.

In another embodiment of the foregoing method, the input control has an output data type and the method further comprises: determining if a data type of an output value of the expression matches the output data type of the input control; and in response to a determination that the data type of the output value of the expression does not match the output data type of the input control, wrapping the first segment with the output data type of the input control in the serialized version of the first segment.

In another embodiment of the foregoing method, the serialized version of the first segment comprises program code for the expression and indicates a data type of function for the first segment.

In another embodiment of the foregoing method, the method further comprises: loading the serialized representation; deserializing the serialized version of the first segment; and re-filling the input control with the first segment and the second segment.

A computer-readable medium having computer program logic recorded thereon that when executed by a processor causes the processor to perform a method, the method comprises: receiving, via a same input control, an expression as a first segment and a different type of data from expression as a second segment; and generating a serialized representation that includes a serialized version of the first segment and a serialized version of the second segment.

In one embodiment of the foregoing computer-readable medium, the method further comprises: providing an expression configuration control configured to receive a definition of the expression for the first segment; and assigning a data type of function to the first segment in response to providing the expression configuration control.

In another embodiment of the foregoing computer-readable medium, wherein said receiving comprises: automatically detecting the first segment contains the expression; and assigning a data type of function to the first segment based on the automatic detection.

In another embodiment of the foregoing computer-readable medium, the method further comprises executing the expression at runtime based on received input data to generate a result.

In another embodiment of the foregoing computer-readable medium, the input control has an output data type and the method further comprises: determining if a data type of an output value of the expression matches the output data type of the input control; and in response to a determination that the data type of the output value of the expression does not match the output data type of the input control, wrapping the first segment with the output data type of the input control in the serialized version of the first segment.

In another embodiment of the foregoing computer-readable medium, the serialized version of the first segment comprises program code for the expression and indicates a data type of function for the first segment.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A workflow development system, comprising:
a processor; and
a memory that stores program code configured to be executed by the processor, the program code comprising:
   a step configuration interface configured to
      receive expression information and at least one further data segment as an input via a same graphical user interface (GUI) input control, wherein the GUI input control is an input text box, the received input including:
         a first segment that includes an expression having a first data type, the expression comprising at least one of a type of expression, an equation, dynamic content, or a syntax used to express a mathematical or logical relationship, and
         a second segment having a second data type different from the first data type; and
      display the first segment and the second segment side-by-side in the input text box; and
   a logic generator configured to
      generate a serialized representation of the received input configured to be evaluated during runtime that includes
         a serialized version of the first segment and
         a serialized version of the second segment.

2. The system of claim 1, wherein the step configuration interface comprises:
an expression editor configured to provide an expression configuration control configured to receive a definition of the expression for the first segment, and to assign function as the first data type in response to providing the expression configuration control.

3. The system of claim 1, wherein the step configuration interface comprises:
an expression detector configured to automatically detect that the first segment contains the expression and to assign function as the first data type based on the automatic detection.

4. The system of claim 1, wherein the program code further comprises:
an execution engine configured to, at runtime, generate a result of the expression based on received input data.

5. The system of claim 1, wherein the input control has an output data type, and the logic generator comprises:
an expression serializer configured to generate the serialized version of the first segment, the expression serializer configured to wrap the first segment with the output data type of the input control in response to determining that a data type of an output value of the expression does not match the output data type of the input control.

6. The system of claim 1, wherein the serialized version of the first segment comprises program code for the expression and indicates function as the first data type.

7. The system of claim 5, wherein the step configuration interface is configured to load the serialized representation, the step configuration interface comprising:
an expression deserializer configured to deserialize the serialized version of the first segment; and
the step configuration interface is configured to refill the input control with the first segment and the second segment.

8. A method in a workflow development system in a computing device, comprising:

receiving, via a same graphical user interface (GUI) input control that is an input text box, expression information and at least one further data segment as an input, the received input including a first segment that includes an expression having a first data type and a second segment having a second data type different from the first data type, the expression comprising at least one of a type of expression, an equation, dynamic content, or a syntax used to express a mathematical or logical relationship;

displaying the first segment and the second segment side-by-side in the input text box; and generating a serialized representation of the received input configured to be evaluated during runtime that includes a serialized version of the first segment and a serialized version of the second segment.

9. The method of claim 8, wherein said receiving comprises:

providing an expression configuration control configured to receive a definition of the expression for the first segment; and assigning function as the first data type in response to providing the expression configuration control.

10. The method of claim 8, wherein said receiving comprises:

automatically detecting the first segment contains the expression; and assigning function as the first data type based on the automatic detection.

11. The method of claim 8, further comprising:

executing the expression at runtime based on received input data to generate a result.

12. The method of claim 8, wherein the input control has an output data type and the method further comprises:

determining if a data type of an output value of the expression matches the output data type of the input control; and in response to a determination that the data type of the output value of the expression does not match the output data type of the input control, wrapping the first segment with the output data type of the input control in the serialized version of the first segment.

13. The method of claim 8, wherein the serialized version of the first segment comprises program code for the expression and indicates function as the first data type.

14. The method of claim 12, further comprising:

loading the serialized representation;

deserializing the serialized version of the first segment; and re-filling the input control with the first segment and the second segment.

15. A computer-readable medium having computer program logic recorded thereon that when executed by processor causes the processor to perform a method in a workflow development system, the method comprising:

receiving, via a same graphical user interface (GUI) input control that is an input text box, expression information and at least one further data segment as an input, the received input including a first segment that includes an expression having a first data type and a second segment having a second data type different from the first data type, the expression comprising at least one of a type of expression, an equation, dynamic content, or a syntax used to express a mathematical or logical relationship;

displaying the first segment and the second segment side-by-side in the input text box; and generating a serialized representation of the received input configured to be evaluated during runtime that includes a serialized version of the first segment and a serialized version of the second segment.

16. The computer-readable medium of claim 15, wherein said receiving comprises:

providing an expression configuration control configured to receive a definition of the expression for the first segment; and assigning function as the first data type in response to providing the expression configuration control.

17. The computer-readable medium of claim 15, wherein said receiving comprises:

automatically detecting the first segment contains the expression; and assigning function as the first data type based on the automatic detection.

18. The computer-readable medium of claim 15, wherein the method further comprises:

executing the expression at runtime based on received input data to generate a result.

19. The computer-readable medium of claim 15, wherein the input control has an output data type and the method further comprises:

determining if a data type of an output value of the expression matches the output data type of the input control; and in response to a determination that the data type of the output value of the expression does not match the output data type of the input control, wrapping the first segment with the output data type of the input control in the serialized version of the first segment.

20. The computer-readable medium of claim 15, wherein the serialized version of the first segment comprises program code for the expression and indicates function as the first data type.

* * * * *